(12) United States Patent
Zhang et al.

(10) Patent No.: US 11,448,861 B2
(45) Date of Patent: Sep. 20, 2022

(54) ZOOM LENS GROUP

(71) Applicant: ZHEJIANG SUNNY OPTICS CO., LTD., Zhejiang (CN)

(72) Inventors: Yi Zhang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 0 days.

(21) Appl. No.: 17/111,538

(22) Filed: Dec. 4, 2020

(65) Prior Publication Data
US 2021/0325644 A1    Oct. 21, 2021

(30) Foreign Application Priority Data

Apr. 21, 2020  (CN) .......................... 202010316870.5

(51) Int. Cl.
*G02B 15/14*   (2006.01)

(52) U.S. Cl.
CPC ..... *G02B 15/1445* (2019.08); *G02B 15/1441* (2019.08)

(58) Field of Classification Search
CPC ............ G02B 15/1445; G02B 15/1441; G02B 15/177
USPC ............................................... 359/642–830
See application file for complete search history.

(56) References Cited

U.S. PATENT DOCUMENTS

| | | | |
|---|---|---|---|
| 2002/0080499 A1* | 6/2002 | Nagahara ....... | G02B 15/145523 359/684 |
| 2004/0156120 A1* | 8/2004 | Yoneyama ..... | G02B 15/145523 359/680 |
| 2006/0139766 A1* | 6/2006 | Sawamoto ..... | G02B 15/145523 359/680 |
| 2008/0231962 A1* | 9/2008 | Yamada ............ | G02B 15/1465 359/649 |
| 2009/0015934 A1* | 1/2009 | Amano ................ | G02B 15/177 359/683 |
| 2009/0219624 A1* | 9/2009 | Yamamoto ......... | G02B 15/1465 359/684 |
| 2020/0257084 A1* | 8/2020 | Dai .................... | G02B 13/0045 |

FOREIGN PATENT DOCUMENTS

WO   WO-2013061535 A1 *  5/2013 ............. G02B 15/04

* cited by examiner

*Primary Examiner* — Mahidere S Sahle
(74) *Attorney, Agent, or Firm* — Gang Yu

(57) ABSTRACT

The disclosure discloses a zoom lens group, which sequentially includes from an object side to an image side along an optical axis: a first lens group having a negative refractive power; a second lens group having a positive refractive power; a third lens group having a refractive power and having a fifth lens and a sixth lens, wherein the fifth lens and the sixth lens are formed into a cemented lens; and a fourth lens group having a refractive power. By adjusting a spacing distance on the optical axis between the first lens group and the second lens group, a spacing distance on the optical axis between the second lens group and the third lens group and a spacing distance on the optical axis between the third lens group and the fourth lens group, the zoom lens group is switched from a long-focus state to a wide-angle state.

11 Claims, 21 Drawing Sheets distortion curve lateral color curve longitudinal aberration curve astigmatism curve longitudinal aberration curve astigmatism curve

ZOOM LENS GROUP

CROSS-REFERENCE TO RELATED APPLICATION(S)

The disclosure claims priority to and the benefit of Chinese Patent Application No. 202010316870.5, filed in the China National Intellectual Property Administration (CNIPA) on 21 Apr. 2020, which is incorporated herein by reference in its entirety.

TECHNICAL FIELD

The disclosure relates to the field of optical elements, and particularly, the disclosure relates to a zoom lens group.

BACKGROUND

With a photographing technology developing and an Internet industry rising, users have increasingly higher requirements for photographing levels and qualities of mobile apparatuses such as smart phones and cameras. At present, a common method for optimizing a lens image quality by lens manufacturers in the present field is to combine and match an ultra-clear main photographing lens, an ultra-large wide-angle lens and a long-focus lens. However, at present, lenses of such a combination and match on the market need to switch different lenses to complete a zoom when photographing different scenes. For example, a zoom of an existing rear camera is mostly of a "relay baton" type, that is, a "continuous" zoom in a non-real optical sense is realized by means of wide angle-main photographing-long focus switching use. In addition, installing a plurality of lenses in the mobile apparatus not only greatly occupies an internal space of the mobile apparatus, but also causes lots of problems such as a high cost, a large size and a large weight increase.

It is one of the key problems to be solved urgently by lots of optical lens designers to realize a "continuous" zoom in a real optical sense and effectively ensure that a zoom lens group has the characteristics of, a low cost, a small size, a light weight, a fluent and smooth transition of a picture in an optical zoom process, etc.

SUMMARY

One implementation mode of the disclosure provides such a zoom lens group, the zoom lens group sequentially includes from an object side to an image side along an optical axis: a first lens group having negative refractive power and including a first lens and a second lens, wherein the first lens has a positive refractive power, an object-side surface thereof is a convex surface, and an image-side surface thereof is a concave surface; a second lens group having a positive refractive power and including a third lens and a fourth lens; a third lens group having a refractive power and including a fifth lens and a sixth lens, wherein the fifth lens and the sixth lens are formed into a cemented lens; and a fourth lens group having a refractive power and including a seventh lens. A spacing distance on the optical axis between the first lens group and the second lens group, a spacing distance on the optical axis between the second lens group and the third lens group and a spacing distance on the optical axis between the third lens group and the fourth lens group may be changed to realize the switch of the zoom lens group from a long-focus state to a wide-angle state.

In an implementation mode, from an object-side surface of the first lens to an image-side surface of the seventh lens, at least one from thereamong is an aspherical surface.

In an implementation mode, a total effective focal length FT when the zoom lens group is in the long-focus state and a total effective focal length FW when the zoom lens group is in the wide-angle state may satisfy: $1.9<FT/FW<2.9$.

In an implementation mode, an effective focal length F1 of the first lens group and an effective focal length F2 of the second lens group may satisfy: $-2.9<F1/F2<-1.6$.

In an implementation mode, a total effective focal length FT when the zoom lens group is in the long-focus state may satisfy: $29\text{ mm}<FT<36\text{ mm}$.

In an implementation mode, a curvature radius R1 of an object-side surface of the first lens, a curvature radius R2 of an image-side surface of the first lens and a total effective focal length FW when the zoom lens group is in the wide-angle state may satisfy: $1.0<(R1+R2)/FW<1.5$.

In an implementation mode, an effective focal length f11 of the first lens, an effective focal length f12 of the second lens and an effective focal length f31 of the fifth lens may satisfy: $0.8<(f11+f12)/f31<1.3$.

In an implementation mode, an effective focal length f21 of the third lens and a curvature radius R5 of an object-side surface of the third lens may satisfy: $0.8f21/R5<1.3$.

In an implementation mode, a center thickness CT1 of the first lens on the optical axis and a center thickness CT7 of the seventh lens on the optical axis may satisfy: $1.0<CT1/CT7<2.8$.

In an implementation mode, a curvature radius R13 of an object-side surface of the seventh lens and a curvature radius R14 of an image-side surface of the seventh lens may satisfy: $0.5<R13/R14<1.0$.

In an implementation mode, a maximum angle of field of view FOVW when the zoom lens group is in the wide-angle state may satisfy: $20°<FOVW<26°$.

In an implementation mode, at least one of the third lens and the fourth lens is a plastic lens, and at least one of an object-side surface of the third lens, an image-side surface of the third lens, an object-side surface of the fourth lens and an image-side surface of the fourth lens is an aspherical surface.

In an implementation mode, lenses in at least one lens group of the first lens group and the third lens group are glass lenses.

By rationally distributing the refractive power and optimizing optical parameters, the disclosure provides a zoom lens group having a continuous zoom, a small size, a high integration degree and a good imaging quality.

BRIEF DESCRIPTION OF THE DRAWINGS

Other features, objects and advantages of the disclosure will become more obvious upon reading the detailed descriptions of the non-limiting embodiments with reference to the following accompanying drawings.

DETAILED DESCRIPTION OF THE EMBODIMENTS

Figure 1:
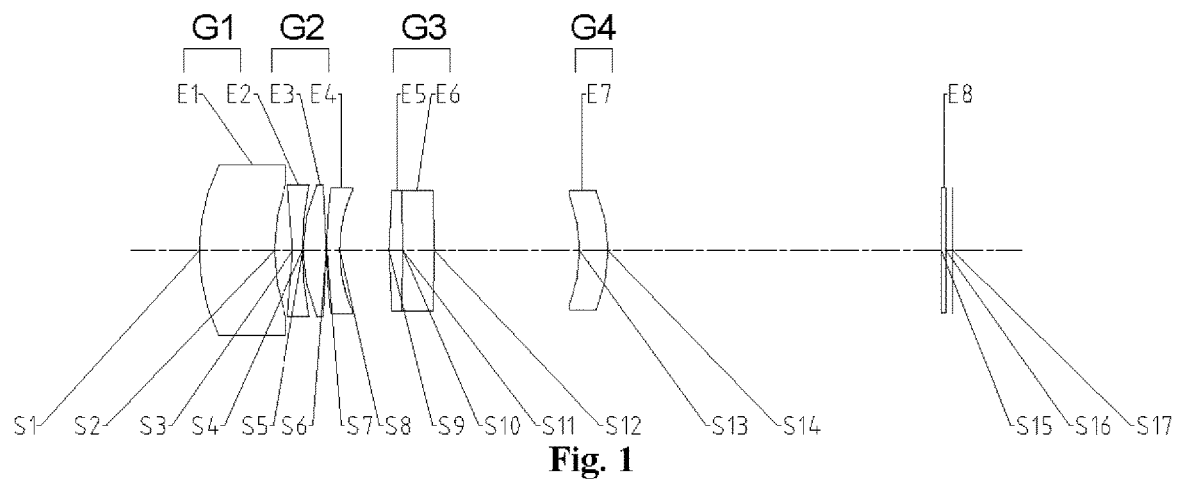
FIG. 1 shows a schematic structural view of a zoom lens group in a long-focus state according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

A zoom lens group according to an exemplary embodiment of the disclosure may include four lens groups having refractive powers, which are a first lens group, a second lens group, a third lens group and a fourth lens group respectively. By adjusting a spacing distance on an optical axis between the first lens group and the second lens group, a spacing distance on the optical axis between the second lens group and the third lens group and a spacing distance on the optical axis between the third lens group and the fourth lens group, the zoom lens group can be switched from a long-focus state to a wide-angle state.

According to the exemplary embodiment of the disclosure, the first lens group may have a negative refractive power and may include a first lens and a second lens, wherein the first lens may have a positive refractive power, an object-side surface thereof is a convex surface, and an image-side surface thereof is a concave surface; the second lens group may have a positive refractive power and may include a third lens and a fourth lens; the third lens group may have a positive or negative refractive power and may include a fifth lens and a sixth lens, wherein the fifth lens and the sixth lens may be formed into a cemented lens; and the fourth lens group may have a positive or negative refractive power and may include a seventh lens. These seven lenses are sequentially arranged from an object side to an image side along the optical axis.

By rationally distributing the refractive power among all the lens groups and the refractive power of each lenses in each of all the lens groups, the distances between the lens groups can be controlled, such that when an entire system is switched from the long-focus state to the wide-angle state during operation, the above-mentioned four lens groups can realize a continuous zoom function by adjusting the spacing distances between adjacent lens groups. Particularly, a zoom process may be implemented in the following way: by rationally distributing the refractive power of the system, when the system is in the wide-angle state, the spacing distance of a zoom group composed of the first lens group and the second lens group is the largest, and the spacing distance of a compensation group composed of the second lens group and the third lens group is the smallest, such that the system realizes the objectives of the minimum focal length and the maximum angle of field of view. When the system is switched from the wide-angle state to the long-focus state, the spacing distance of the zoom group composed of the first lens group and the second lens group is shortened, and the spacing distance of the compensation group composed of the second lens group and the third lens group is lengthened. A ratio of a total effective focal length of the zoom lens group in the long-focus state to a total effective focal length of the zoom lens group in the wide-angle state can be continuously changed, so as to complete a continuous zoom process of the zoom lens group.

In an exemplary embodiment, the zoom lens group according to the disclosure may satisfy: 1.9<FT/FW<2.9, wherein FT is a total effective focal length of the zoom lens group in the long-focus state, and FW is a total effective focal length of the zoom lens group in the wide-angle state. More particularly, FT and FW may further satisfy: 1.9<FT/FW<2.8. With 1.9<FT/FW<2.9 satisfied, under the condition of controlling sizes of image surfaces of the zoom lens group in the long-focus state and the wide-angle state, a continuous zoom range can be effectively controlled, such that the lens system has the continuous zoom function in a certain range.

In an exemplary embodiment, the zoom lens group according to the disclosure may satisfy: −2.9<F1/F2<−1.6, wherein F1 is an effective focal length of the first lens group, and F2 is an effective focal length of the second lens group. With −2.9<F1/F2<−1.6 satisfied, the refractive power of the entire system can be rationally distributed, thereby ensuring that the system has the continuous zoom function in a certain range.

In an exemplary embodiment, the zoom lens group according to the disclosure may satisfy: 29 mm<FT<36 mm, wherein FT is a total effective focal length of the zoom lens group in the long-focus state. With 29 mm<FT<36 mm satisfied, the system may have a large effective focal length in the long-focus state, which is conducive to ensuring that the entire system has the continuous zoom function in a large range.

In an exemplary embodiment, the zoom lens group according to the disclosure may satisfy: 1.0<(R1+R2)/FW<1.5, wherein R1 is a curvature radius of an object-side surface of the first lens, R2 is a curvature radius of an image-side surface of the first lens and FW is a total effective focal length when the zoom lens group is in the wide-angle state. More particularly, R1, R2 and FW may further satisfy: 1.1<(R1+R2)/FW<1.4. With 1.0<(R1+R2)/FW<1.5 satisfied, the refractive power of each lenses in the first lens group can be rationally distributed, such that the total effective focal length in the wide-angle state is in a small range, thereby effectively ensuring that the system has a large continuous zoom range.

In an exemplary embodiment, the zoom lens group according to the disclosure may satisfy: 0.8<(f11+f12)/f31<1.3, wherein f11 is an effective focal length of the first lens, f12 is an effective focal length of the second lens and f31 is an effective focal length of the fifth lens. More particularly, f11, f12 and f31 may further satisfy: 0.9<(f11+f12)/f31<1.3. With 0.8<(f11+f12)/f31<1.3 satisfied, the refractive power of the first lens, the second lens and the third lens can be effectively distributed, such that the system has a high image quality under the condition of ensuring a key parameter of the system.

In an exemplary embodiment, the zoom lens group according to the disclosure may satisfy: 0.8<f21/R5<1.3, wherein f21 is an effective focal length of the third lens, and R5 is a curvature radius of an object-side surface of the third lens. With 0.8<f21/R5<1.3 satisfied, both the object-side surface and an image-side surface of the third lens, which are members bearing main refractive power of the second lens group, can bear rational refractive power, such that the sensitivity of the third lens can be reduced as much as possible while the third lens meets the optical performance.

In an exemplary embodiment, the zoom lens group according to the disclosure may satisfy: 1.0<CT1/CT7<2.8, wherein CT1 is a center thickness of the first lens on the optical axis, and CT7 is a center thickness of the seventh lens on the optical axis. With 1.0<CT1/CT7<2.8 satisfied, the distortion contribution amounts of the first lens and the seventh lens can be controlled in a rational range, such that the distortion amount of each field of view of the zoom lens group is in a rational required range, which is conducive to meeting the requirements of later software debugging.

In an exemplary embodiment, the zoom lens group according to the disclosure may satisfy: 0.5<R13/R14<1.0, wherein R13 is a curvature radius of an object-side surface of the seventh lens, and R14 is a curvature radius of an image-side surface of the seventh lens. More particularly, R13 and R14 may further satisfy: 0.7<R13/R14<1.0. With 0.5<R13/R14<1.0 satisfied, a coma contribution rate to the entire system of the seventh lens can be effectively controlled in a rational range, thereby well balancing a coma generated by a lens at a front end, so as to obtain a good imaging quality.

In an exemplary embodiment, the zoom lens group according to the disclosure may satisfy: 20°<FOVW<26°, wherein FOVW is a maximum angle of field of view when the zoom lens group is in the wide-angle state. Satisfying 20°<FOVW<26° is conducive to maximizing the effective focal length of the zoom lens group, and further ensuring that the entire system has a large continuous zoom range.

In an exemplary embodiment, at least one of the third lens and the fourth lens is a plastic lens, and at least one of an object-side surface of the third lens, an image-side surface of the third lens, an object-side surface of the fourth lens and an image-side surface of the fourth lens is an aspherical surface. At least one lens in the second lens group is the plastic lens, which is conducive to ensuring that a weight of the entire system is not too heavy. At least one lens in the second lens group is provided with at least one aspherical surface, which is conducive to ensuring that the system has a large number of degrees of freedom for optimization, so as to ensure that the system has a high resolution.

In an exemplary embodiment, lenses in at least one of the first lens group and the third lens group are glass lenses. Since glass is wide in refractive index distribution range and small in expansion coefficient, the lenses in at least one of the first lens group and the third lens group of the entire system are all glass lenses, which is conducive to ensuring that the system has the good imaging quality and controlling a temperature drift effect of the entire system.

In an exemplary embodiment, the zoom lens group according to the disclosure further includes a diaphragm arranged between the first lens group and the second lens group. Optionally, the above-mentioned zoom lens group may further include an optical filter configured to correct chromatic aberration and/or a protective glass configured to protect a photosensitive element located on the imaging surface.

The disclosure provides a zoom lens group, which has the characteristics of a continuous zoom, a high integration level, a small size, a high imaging quality, etc. The zoom lens group according to the above-mentioned embodiment of the disclosure may use multiple lenses, such as the above-mentioned seven lenses. By rationally distributing the refractive power and surface type of each lens, center thicknesses of each lens, axial spacing between each lenses, etc., incident light rays can be effectively converged, an optical total length of an imaging lens is reduced and the processability of the imaging lens is improved, such that the zoom lens group is more conducive to producing and processing.

In an embodiment of the disclosure, at least one of the surfaces of each lens is an aspherical surface. The aspherical lens has the features that the curvature varies continuously from the center of the lens to the periphery of the lens. Unlike a spherical lens having a constant curvature from the center of the lens to the periphery of the lens, an aspherical lens has better curvature radius characteristics, and has the advantages of improving distortion and improving astigmatic aberration. By adopting the aspherical lens, the aberration occurring during imaging can be eliminated as much as possible, thereby improving the imaging quality. Optionally, at least one of an object-side surface and an image-side surface of each of the first lens, the second lens, the third lens, the fourth lens, the fifth lens, the sixth lens, and the seventh lens is the aspherical surface. Optionally, an object-side surface and an image-side surface of each of the first lens, the second lens, the third lens, the fourth lens, the fifth lens, the sixth lens and the seventh lens are both the aspherical surfaces.

However, those skilled in the art should know that the number of the lenses forming the zoom lens group may be changed without departing from the technical solutions claimed in the disclosure to achieve each result and advantage described in the description. For example, although descriptions are made in the implementation mode with seven lenses as an example, the zoom lens group is not limited to seven lenses. If necessary, the zoom lens group may further include another number of lenses.

Specific embodiments of the zoom lens group applicable to the embodiments above are further described below with reference to the accompanying drawings.

Embodiment 1

Figure 2:
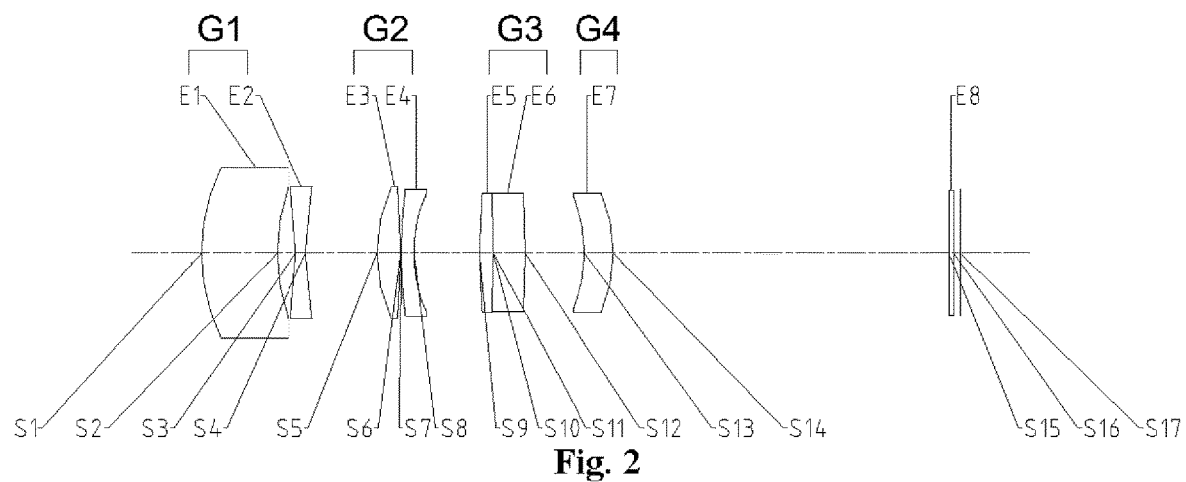
FIG. 2 shows a schematic structural view of the zoom lens group in an intermediate state in a process of being switched from the long-focus state to a wide-angle state according to embodiment 1 of the disclosure.
Figure 3:
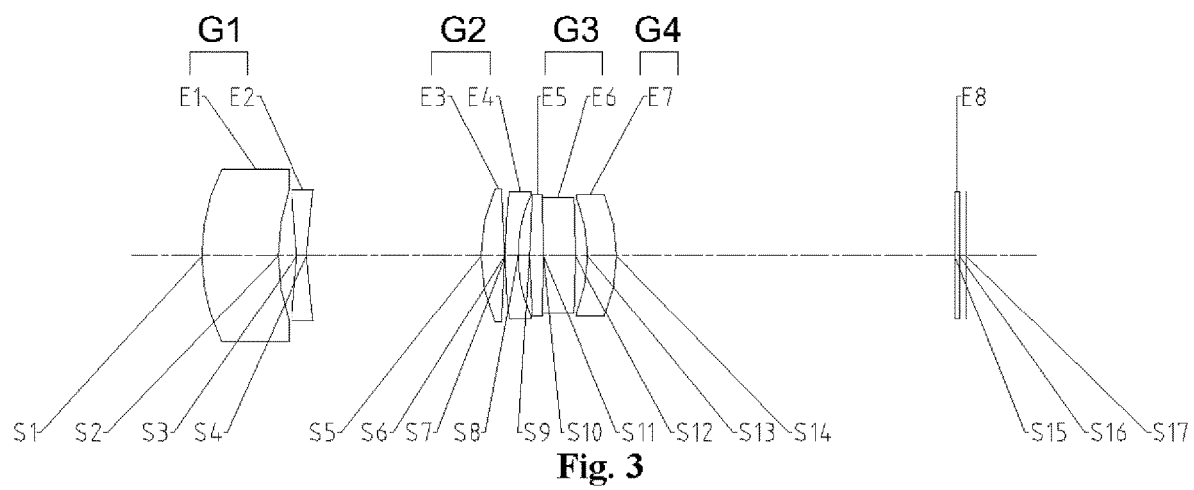
FIG. 3 shows a schematic structural view of the zoom lens group in the wide-angle state according to embodiment 1 of the disclosure.

A zoom lens group according to embodiment 1 of the disclosure is described below with reference to FIG. 1 to FIG. 6D. FIG. 1 shows a schematic structural view of the zoom lens group in a long-focus state according to embodiment 1 of the disclosure; FIG. 2 shows a schematic structural view of the zoom lens group in an intermediate state in a process of being switched from the long-focus state to a wide-angle state according to embodiment 1 of the disclosure; and FIG. 3 shows a schematic structural view of the zoom lens group in the wide-angle state according to embodiment 1 of the disclosure;

As shown in FIG. 1 to FIG. 3, the zoom lens group sequentially includes from an object side to an image side: a first lens group G1 (a first lens E1 and a second lens E2), a second lens group G2 (a third lens E3 and a fourth lens E4), a third lens group G3 (a fifth lens E5 and a sixth lens E6), a fourth lens group G4 (a seventh lens E7), an optical filter E8 and an imaging surface S17.

An object-side surface S1 of the first lens E1 is a convex surface, an image-side surface S2 thereof is a concave surface. An object-side surface S3 of the second lens E2 is a concave surface, an image-side surface S4 thereof is a concave surface. An object-side surface S5 of the third lens E3 is a convex surface, an image-side surface S6 thereof is a convex surface. An object-side surface S7 of the fourth lens E4 is a convex surface, an image-side surface S8 thereof is a concave surface. An object-side surface S9 of the fifth lens E5 is a convex surface, an image-side surface S10 thereof is a convex surface. An object-side surface S11 of the sixth lens E6 is a concave surface, an image-side surface S12 thereof is a convex surface. An object-side surface S13 of the seventh lens E7 is a concave surface, an image-side surface S14 thereof is a convex surface. The optical filter E8 has an object-side surface S15 and an image-side surface S16. Light from an object sequentially penetrates through each of the surfaces from S1 to S16 and is finally imaged on the imaging surface S17.

Table 1 shows a table of basic parameters of the zoom lens group in embodiment 1, wherein units of the curvature radius and the thickness/distance are both millimeter (mm).

TABLE 1

| Surface number | Surface type | Curvature radius | Thickness/ distance | Refractive index | Abbe number | Material | Conic coefficient |
|---|---|---|---|---|---|---|---|
| OBJ | Sphere | Infinity | Infinity | | | | |
| S1 | Sphere | 8.5227 | 3.2648 | 1.91 | 31.4 | Glass | |
| S2 | Sphere | 8.5572 | 0.8066 | | | | |
| S3 | Sphere | −18.1410 | 0.4200 | 1.65 | 58.4 | Glass | |
| S4 | Sphere | 14.4384 | D4 | | | | |
| S5 (STO) | Sphere | 6.9142 | 1.0224 | 1.74 | 52.7 | Glass | |
| S6 | Sphere | −29.1766 | 0.0300 | | | | |
| S7 | Aspherical surface | 22.9486 | 0.5500 | 1.67 | 20.4 | Plastic | 0.0000 |
| S8 | Aspherical surface | 7.0216 | D8 | | | | 0.0000 |
| S9 | Sphere | 27.0482 | 0.6036 | 1.50 | 81.6 | Glass | |
| S10 | Sphere | −57.3354 | 0.0000 | | | | |
| S11 | Sphere | −57.3354 | 1.3721 | 1.93 | 20.9 | Glass | |
| S12 | Sphere | −41.9373 | D12 | | | | |
| S13 | Sphere | −6.1084 | 1.2323 | 1.93 | 20.9 | Glass | |
| S14 | Sphere | −6.6345 | 14.5000 | | | | |
| S15 | Sphere | Infinity | 0.2100 | 1.52 | 64.2 | | |
| S16 | Sphere | Infinity | 0.2900 | | | | |
| S17 | Sphere | Infinity | | | | | |

In the embodiment, by adjusting a spacing distance D4 on an optical axis between the first lens group and the second lens group (that is, a spacing distance on the optical axis from the image-side surface of the second lens E2 to the object-side surface of the third lens E3), a spacing distance D8 on the optical axis between the second lens group and the third lens group (that is, a spacing distance on the optical axis from the image-side surface of the fourth lens E4 to the object-side surface of the fifth lens E5), and a spacing distance D12 on the optical axis between the third lens group and the fourth lens group (that is, a spacing distance on the optical axis from the image-side surface of the sixth lens E6 to the object-side surface of the seventh lens E7), the zoom lens group is switched from the long-focus state to the wide-angle state or from the wide-angle state to the long-focus state. A total effective focal length f, an f-number (Fno) and a maximum field of view (FOV) of the zoom lens group, a total track length (TTL) of the zoom lens group (that is, a distance on the optical axis from the object-side surface S1 of the first lens E1 to the imaging surface S17 of the zoom lens group) and ImgH change as the zoom lens group is switched from the long-focus state to the wide-angle state or from the wide-angle state to the long-focus state, and ImgH is a half of a diagonal length of an effective pixel region on the imaging surface S17 of the zoom lens group.

Table 2 shows a table of various parameters of the zoom lens group in embodiment 1 in different states, wherein units of f, TTL, ImgH, D4, D8 and D12 are all millimeter (mm), and a unit of FOV is degree (°).

TABLE 2

| Various parameters | Long-focus state | Intermediate state | Wide-angle state |
|---|---|---|---|
| f | 29.94 | 21.96 | 15.18 |
| Fno | 4.39 | 3.76 | 3.12 |
| FOV | 10.4 | 14.2 | 20.9 |
| TTL | 32.80 | 32.80 | 32.80 |
| ImgH | 2.72 | 2.72 | 2.72 |
| D4 | 0.03 | 3.10 | 7.48 |
| D8 | 2.14 | 2.81 | 0.48 |
| D12 | 6.33 | 2.59 | 0.54 |

In embodiment 1, the object-side surface S7 and the image-side surface S8 of the fourth lens E4 are both aspherical surfaces, and the surface type x of each aspherical lens can be defined by, but not limited to, the following aspherical equation:

$$x = \frac{ch^2}{1 + \sqrt{1-(k+1)c^2h^2}} + \sum A_i h^i, \quad (1)$$

wherein, x is the distance vector height from a vertex of the aspherical surface when the aspherical surface is at a height of h along the optical axis direction; c is the paraxial curvature of the aspherical surface, c=1/R (that is, the paraxial curvature c is the reciprocal of the curvature radius R in Table 1 above); k is the conic coefficient; and Ai is the correction coefficient of the i-th order of the aspherical surface. Table 3 shows the higher order term coefficients $A_4$, $A_6$, $A_8$, $A_{10}$ and $A_{12}$ and that can be used for each of aspherical surfaces S7 and S8 in embodiment 1.

TABLE 3

| Surface number | A4 | A6 | A8 | A10 | A12 |
|---|---|---|---|---|---|
| S7 | 5.5482E−04 | −6.7063E−05 | 1.9924E−06 | −2.8679E−08 | 2.1129E−10 |
| S8 | 1.4492E−03 | −5.2293E−05 | 3.6304E−06 | −1.0936E−07 | 1.7587E−09 |

Figure 4A:
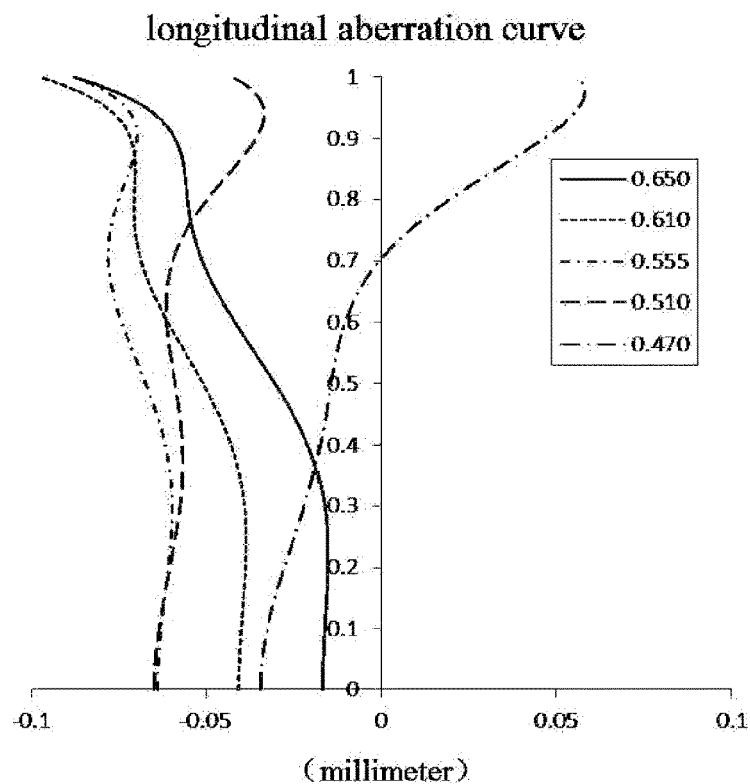
FIG. 4A to FIG. 4D show a longitudinal aberration curve, an astigmatism curve, a distortion curve and a lateral color curve of the zoom lens group in embodiment 1 in the long-focus state respectively.
Figure 4B:
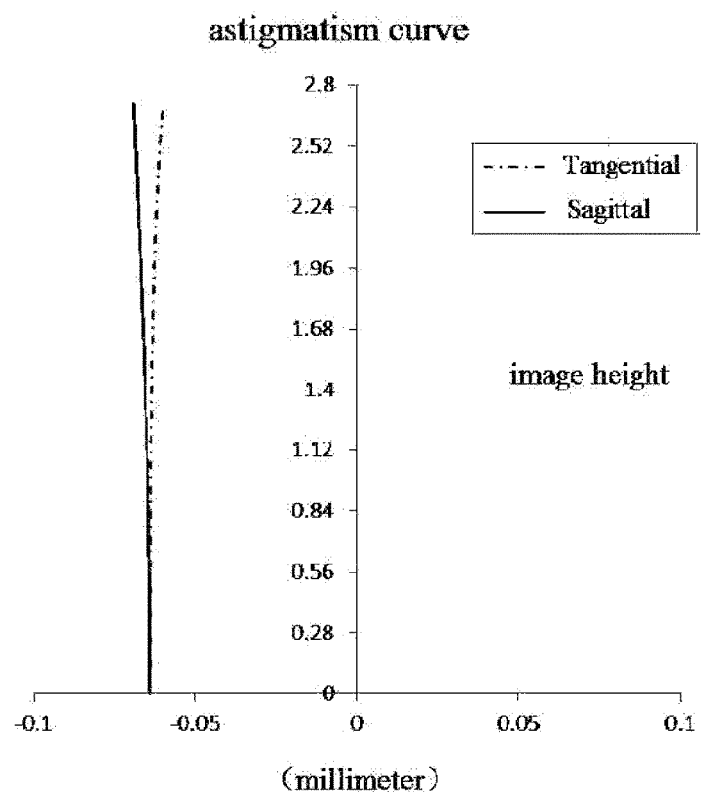
Figure 4C:
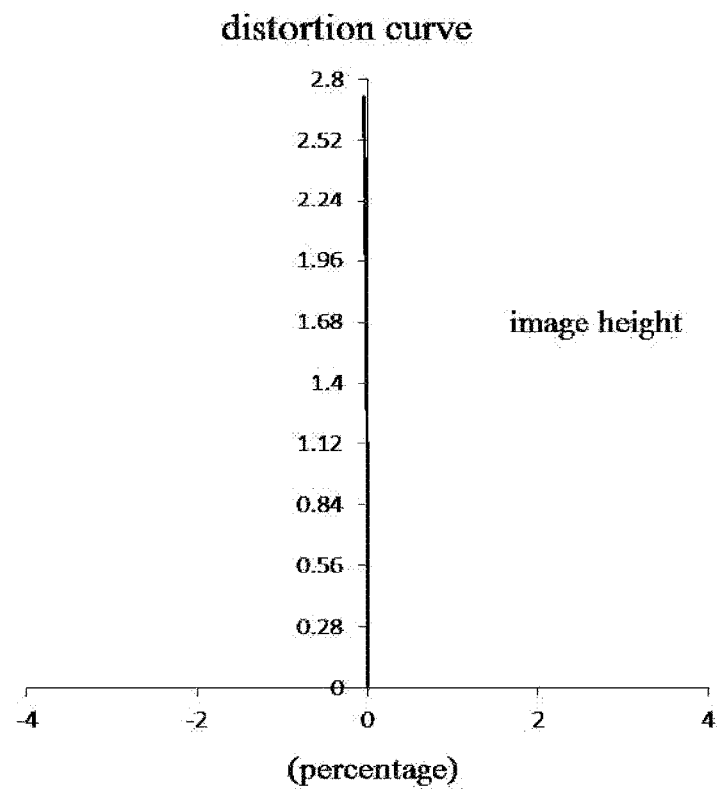
Figure 4D:
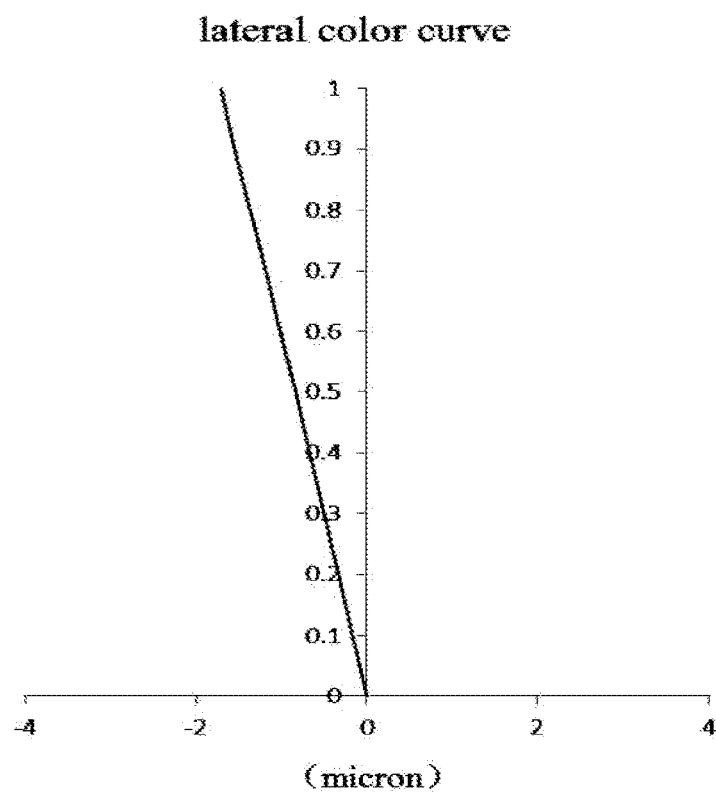
Figure 5A:
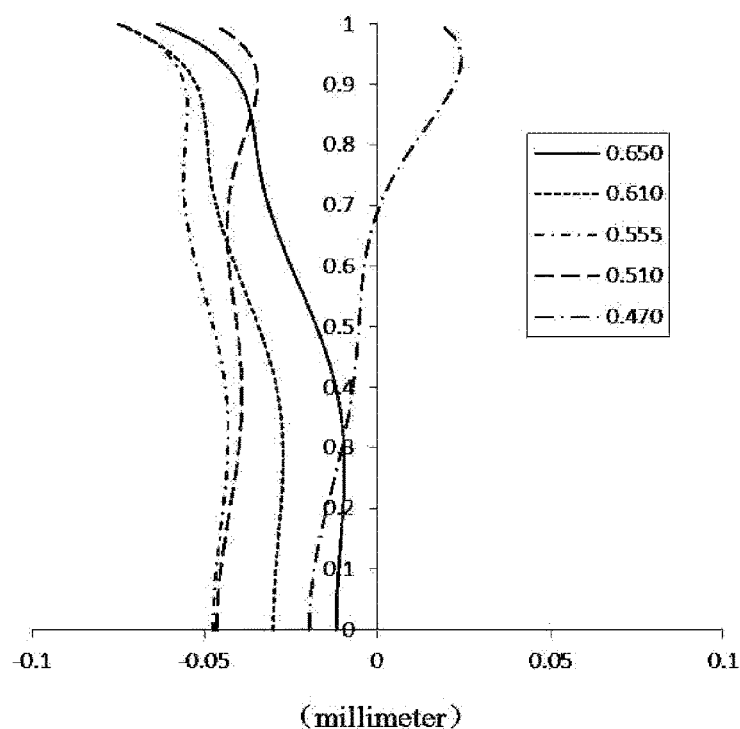
FIG. 5A to FIG. 5D show a longitudinal aberration curve, an astigmatism curve, a distortion curve and a lateral color curve of the zoom lens group in embodiment 1 in the intermediate state in the process of being switched from the long-focus state to the wide-angle state respectively.
Figure 5B:
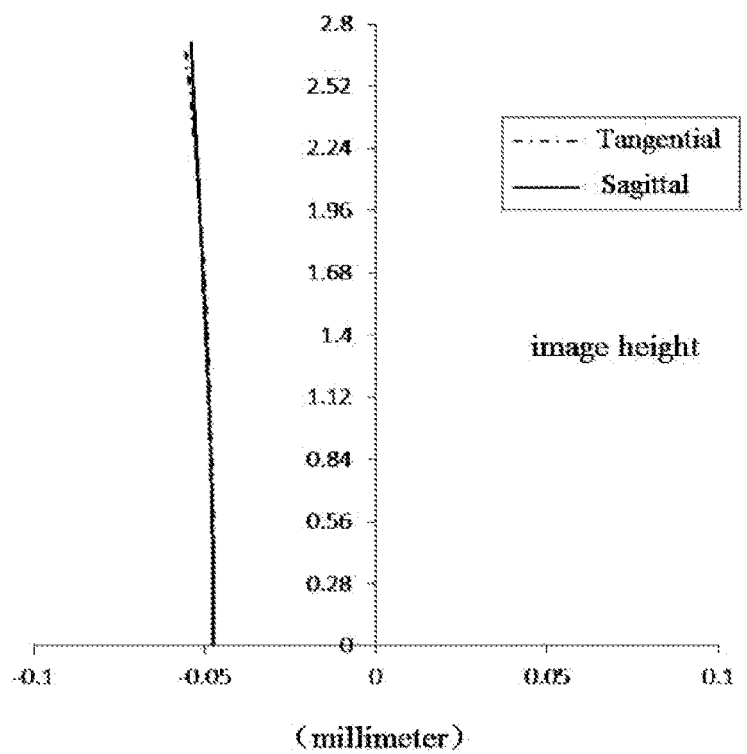
Figure 5C:
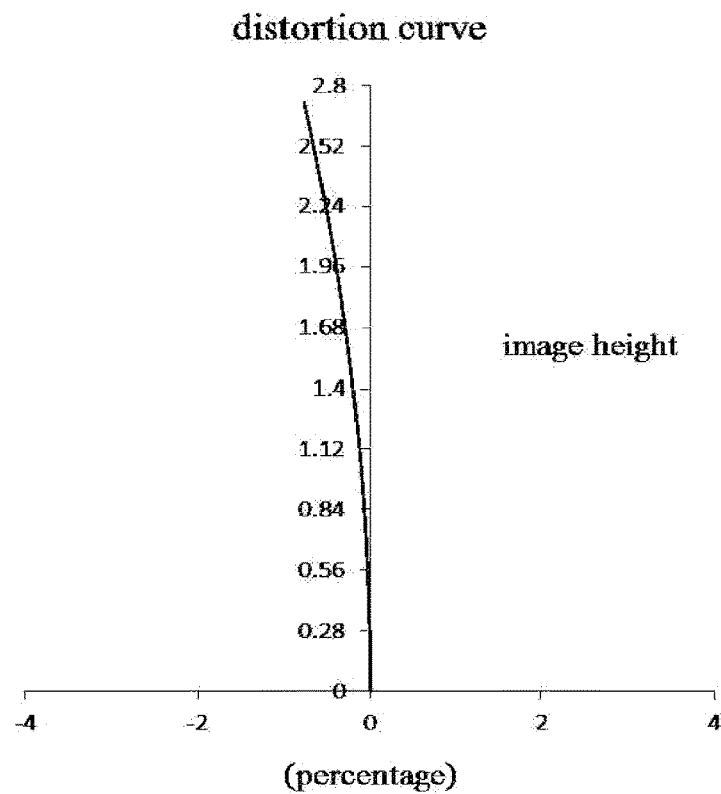
Figure 5D:
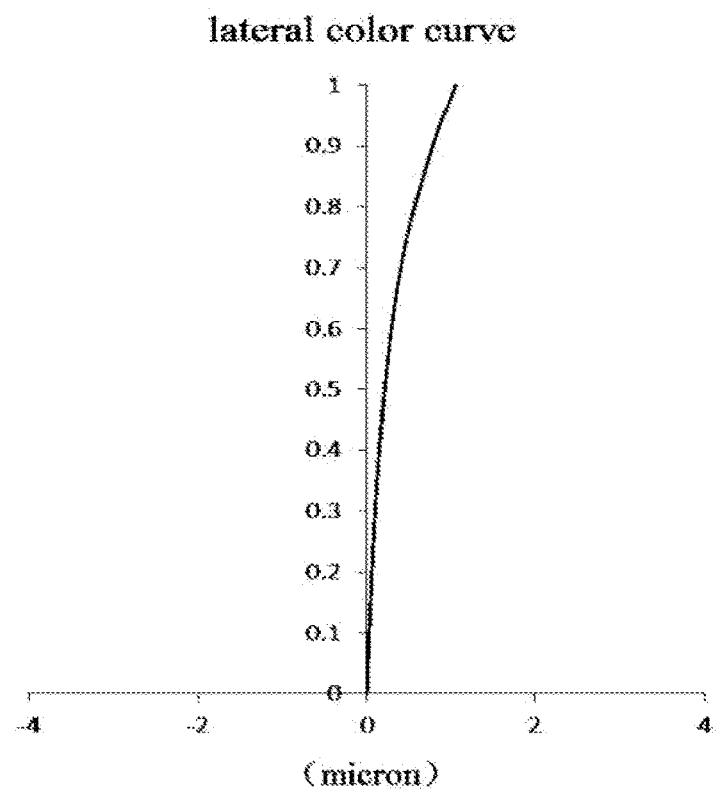
Figure 6A:
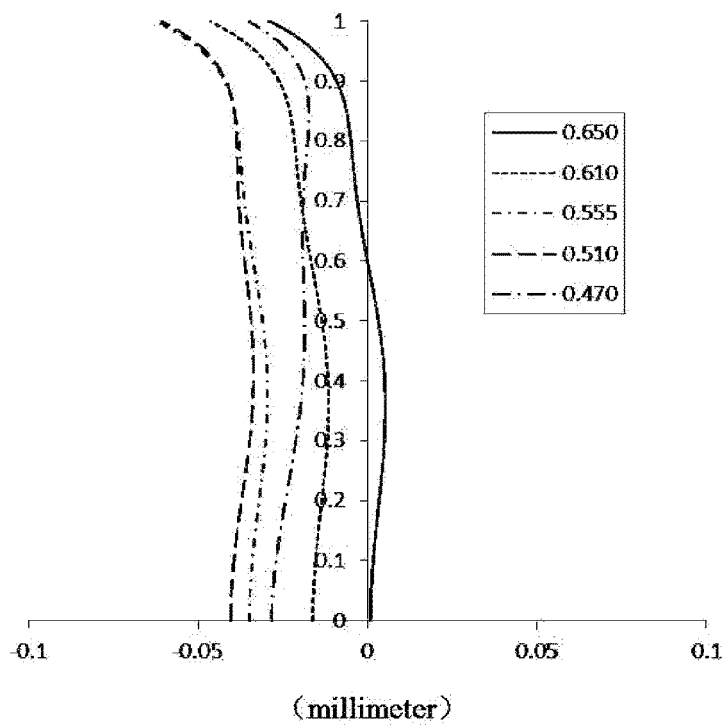
FIG. 6A to FIG. 6D show a longitudinal aberration curve, an astigmatism curve, a distortion curve and a lateral color curve of the zoom lens group in embodiment 1 in the wide-angle state respectively.
Figure 6B:
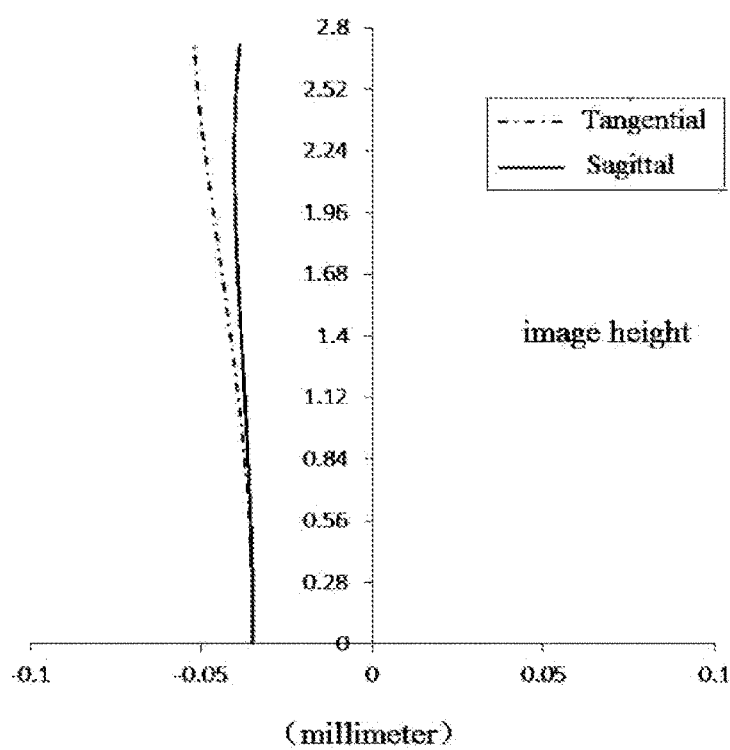
Figure 6C:
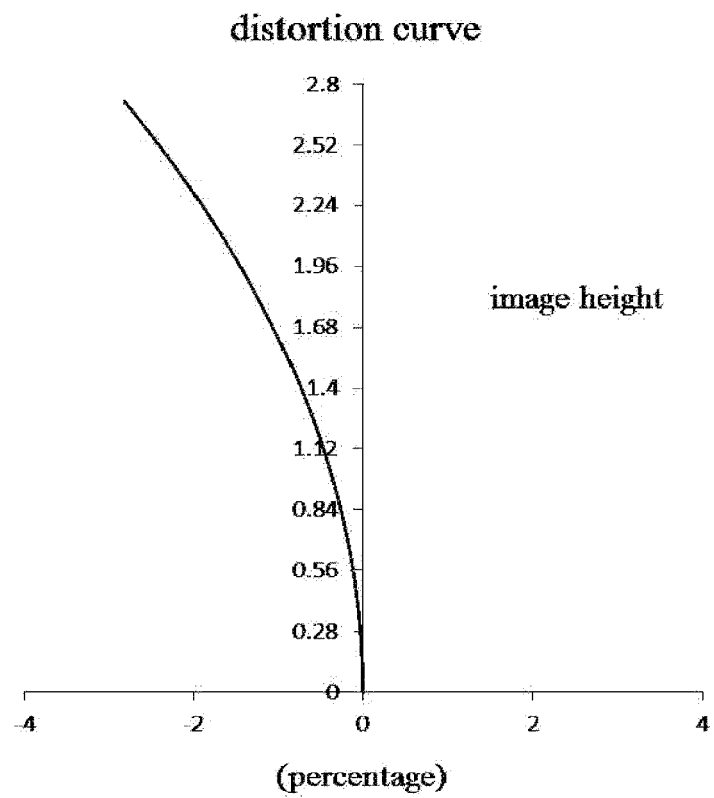
Figure 6D:
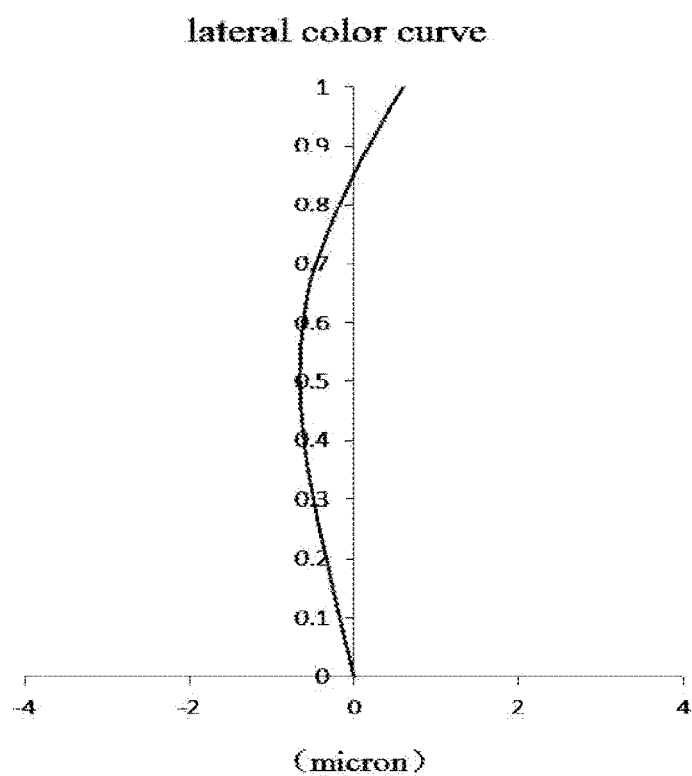

FIG. 4A, FIG. 5A and FIG. 6A separately show longitudinal aberration curves of the zoom lens group in embodiment 1 in the long-focus state, the intermediate state and the wide-angle state, which represents convergence focus deviations of light rays of different wavelengths after passing through the lenses. FIG. 4B, FIG. 5B and FIG. 6B separately show astigmatism curves of the zoom lens group in embodiment 1 in the long-focus state, the intermediate state and the wide-angle state, which represents a curvature of tangential image surface and a curvature of sagittal image surface. FIG. 4C, FIG. 5C and FIG. 6C separately show distortion curves of the zoom lens group in embodiment 1 in the long-focus state, the intermediate state and the wide-angle state, which represents distortion degree values corresponding to different image heights. FIG. 4D, FIG. 5D and FIG. 6D separately show lateral color curves of the zoom lens group in embodiment 1 in the long-focus state, the intermediate state and the wide-angle state, which represents deviations of light rays on different image heights of the imaging surface after passing through the lenses. It can be seen from FIG. 4A to FIG. 6D that the zoom lens group provided in embodiment 1 can realize a good imaging quality in each of all the states.

Embodiment 2

Figure 7:
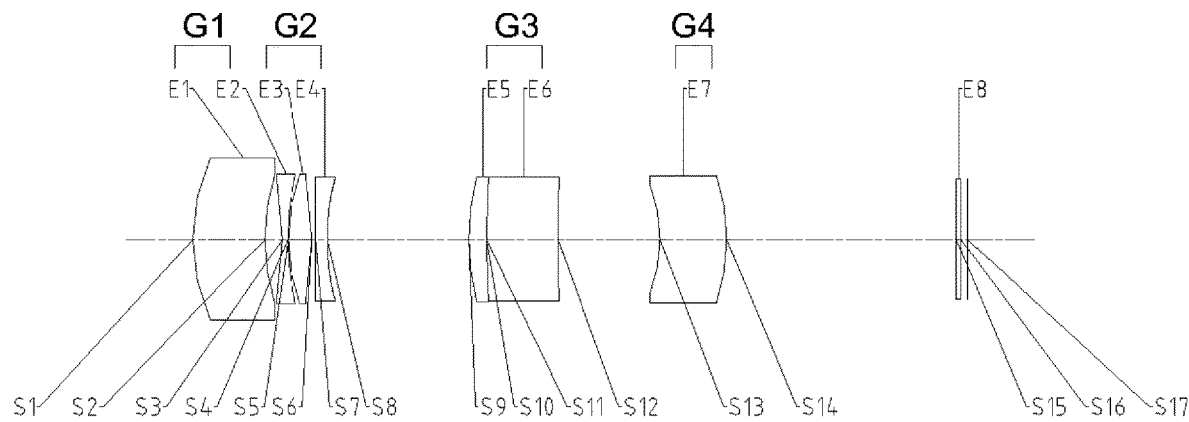
FIG. 7 shows a schematic structural view of a zoom lens group in the long-focus state according to embodiment 2 of the disclosure.
Figure 8:
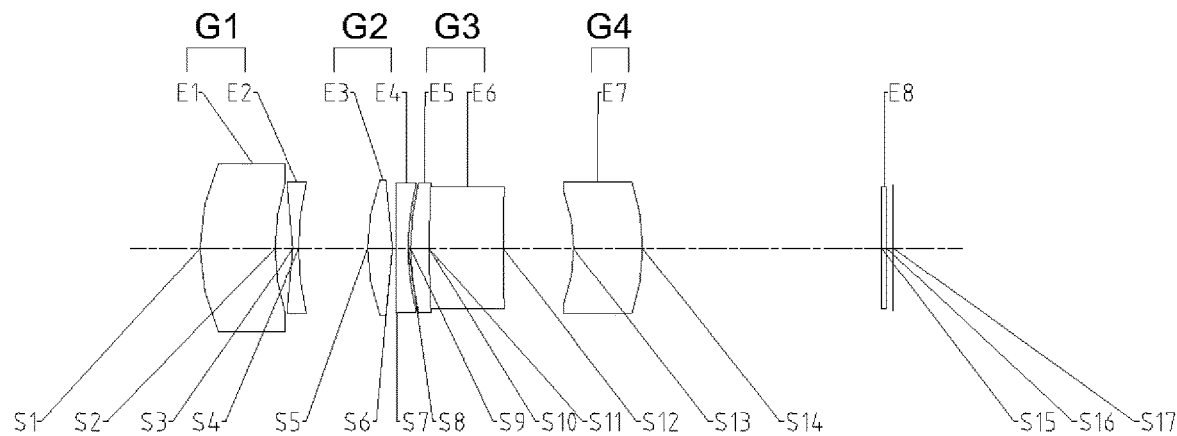
FIG. 8 shows a schematic structural view of the zoom lens group in an intermediate state in a process of being switched from the long-focus state to the wide-angle state according to embodiment 2 of the disclosure.

A zoom lens group according to embodiment 2 of the disclosure is described below with reference to FIG. 7 to FIG. 12D. In the embodiment and the following embodiment, the description similar to that of embodiment 1 will be partially omitted for the sake of brevity. FIG. 7 shows a schematic structural view of the zoom lens group in a long-focus state according to embodiment 2 of the disclosure; FIG. 8 shows a schematic structural view of the zoom lens group in an intermediate state in a process of being switched from the long-focus state to a wide-angle state according to embodiment 2 of the disclosure; and FIG. 9 shows a schematic structural view of the zoom lens group in the wide-angle state according to embodiment 2 of the disclosure.

Figure 9:
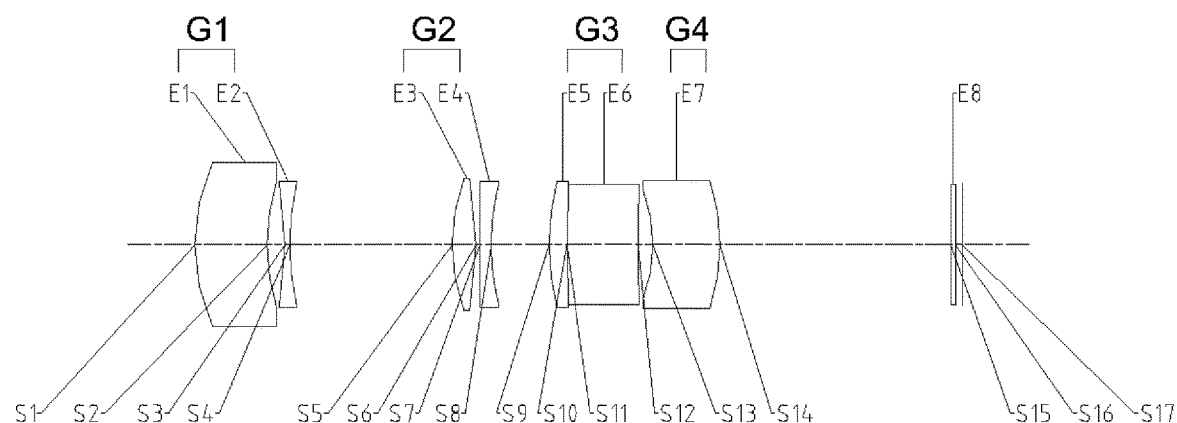
FIG. 9 shows a schematic structural view of the zoom lens group in the wide-angle state according to embodiment 2 of the disclosure.

As shown in FIG. 7 to FIG. 9, the zoom lens group sequentially includes from an object side to an image side: a first lens group G1 (a first lens E1 and a second lens E2), a second lens group G2 (a third lens E3 and a fourth lens E4), a third lens group G3 (a fifth lens E5 and a sixth lens E6), a fourth lens group G4 (a seventh lens E7), an optical filter E8 and an imaging surface S17.

An object-side surface S1 of the first lens E1 is a convex surface, an image-side surface S2 thereof is a concave surface. An object-side surface S3 of the second lens E2 is a concave surface, an image-side surface S4 thereof is a concave surface. An object-side surface S5 of the third lens E3 is a convex surface, an image-side surface S6 thereof is a convex surface. An object-side surface S7 of the fourth lens E4 is a concave surface, an image-side surface S8 thereof is a concave surface. An object-side surface S9 of the fifth lens E5 is a convex surface, an image-side surface S10 thereof is a concave surface. An object-side surface S11 of the sixth lens E6 is a convex surface, an image-side surface S12 thereof is a concave surface. An object-side surface S13 of the seventh lens E7 is a concave surface, an image-side surface S14 thereof is a convex surface. The optical filter E8 has an object-side surface S15 and an image-side surface S16. Light from an object sequentially penetrates through each of the surfaces from S1 to S16 and is finally imaged on the imaging surface S17.

Table 4 shows a table of basic parameters of the zoom lens group in embodiment 2, wherein units of the curvature radius and the thickness/distance are both millimeter (mm).

TABLE 4

| Surface number | Surface type | Curvature radius | Thickness/ distance | Refractive index | Abbe number | Material | Conic coefficient |
|---|---|---|---|---|---|---|---|
| OBJ | Sphere | Infinity | Infinity | | | | |
| S1 | Sphere | 8.8823 | 3.2447 | 1.91 | 31.4 | Glass | |
| S2 | Sphere | 9.6583 | 0.7906 | | | | |
| S3 | Sphere | −16.2675 | 0.2500 | 1.65 | 58.4 | Glass | |
| S4 | Sphere | 12.3954 | D4 | | | | |
| S5 (STO) | Sphere | 8.3463 | 1.0700 | 1.74 | 52.7 | Glass | |
| S6 | Sphere | −15.7284 | 0.1703 | | | | |
| S7 | Aspherical surface | −303.8883 | 0.5264 | 1.67 | 20.4 | Plastic | 0.0000 |
| S8 | Aspherical surface | 12.2540 | D8 | | | | 0.0000 |
| S9 | Sphere | 11.6430 | 0.7992 | 1.50 | 81.6 | Glass | |
| S10 | Sphere | 48.5259 | 0.0000 | | | | |
| S11 | Sphere | 48.5259 | 3.2199 | 1.93 | 20.9 | Glass | |
| S12 | Sphere | 92.7440 | D12 | | | | |
| S13 | Sphere | −6.9347 | 3.0059 | 1.93 | 20.9 | Glass | |
| S14 | Sphere | −9.2060 | 10.3811 | | | | |
| S15 | Sphere | Infinity | 0.2100 | 1.52 | 64.2 | | |
| S16 | Sphere | Infinity | 0.2900 | | | | |
| S17 | Sphere | Infinity | | | | | |

In the embodiment, by adjusting a spacing distance D4 on an optical axis between the first lens group and the second lens group, a spacing distance D8 on the optical axis between the second lens group and the third lens group and a spacing distance D12 on the optical axis between the third lens group and the fourth lens group, the zoom lens group is switched from the long-focus state to the wide-angle state or from the wide-angle state to the long-focus state. A total effective focal length f, an f-number Fno and a maximum field of view FOV of the zoom lens group, a total track length TTL of the zoom lens group and ImgH change as the zoom lens group is switched from the long-focus state to the wide-angle state or from the wide-angle state to the long-focus state, and ImgH is a half of a diagonal length of an effective pixel region on the imaging surface S17 of the zoom lens group.

Table 5 shows a table of various parameters of the zoom lens group in embodiment 2 in different states, wherein units of f, TTL, ImgH, D4, D8 and D12 are all millimeter (mm), and a unit of FOV is degree)(°).

TABLE 5

| Various parameters | Long-focus state | Intermediate state | Wide-angle state |
|---|---|---|---|
| f | 30.06 | 19.97 | 15.11 |
| Fno | 4.29 | 3.36 | 3.10 |
| FOV | 10.4 | 15.6 | 21.1 |
| TTL | 35.00 | 30.08 | 34.48 |
| ImgH | 2.72 | 2.72 | 2.72 |
| D4 | 0.03 | 2.99 | 7.27 |
| D8 | 6.38 | 0.09 | 2.59 |
| D12 | 4.63 | 3.05 | 0.66 |

Table 6 shows high order term coefficients applicable to various aspherical surfaces in embodiment 2, wherein each aspherical surface type can be defined by the equation (1) provided in above-mentioned embodiment 1.

TABLE 6

| Surface number | A4 | A6 | A8 | A10 | A12 |
|---|---|---|---|---|---|
| S7 | 3.6903E−04 | −3.9860E−05 | 9.6922E−07 | −1.1518E−08 | 7.1653E−11 |
| S8 | 9.7424E−04 | −3.0938E−05 | 1.5355E−06 | −4.0302E−08 | 4.8859E−10 |

Figure 10A:
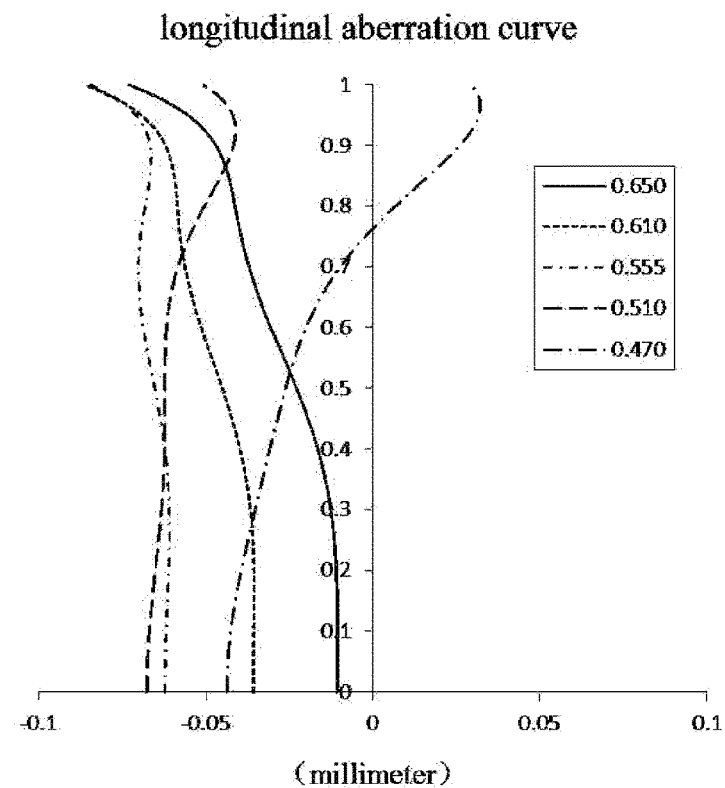
FIG. 10A to FIG. 10D show a longitudinal aberration curve, an astigmatism curve, a distortion curve and a lateral color curve of the zoom lens group in embodiment 2 in the long-focus state respectively.
Figure 10B:
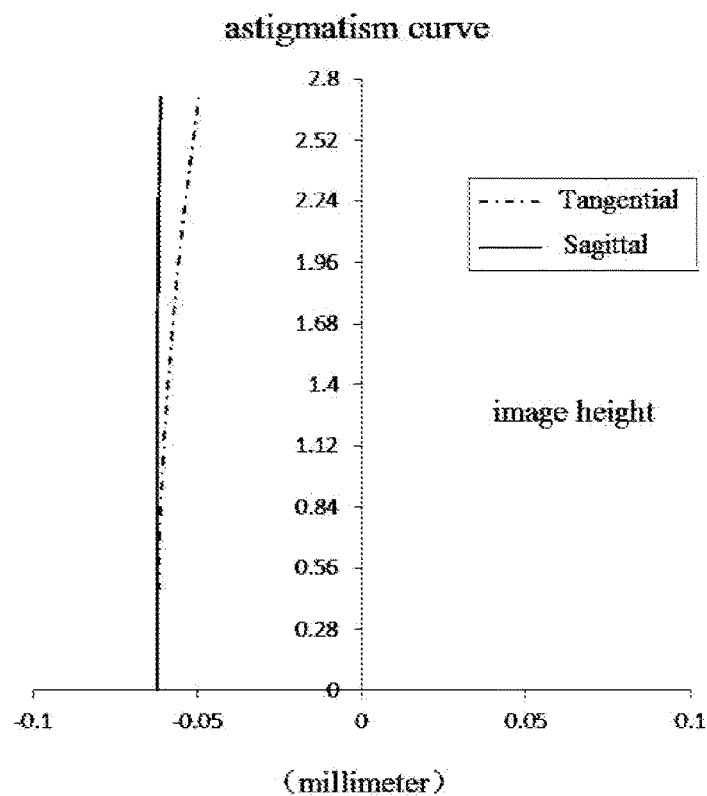
Figure 10C:
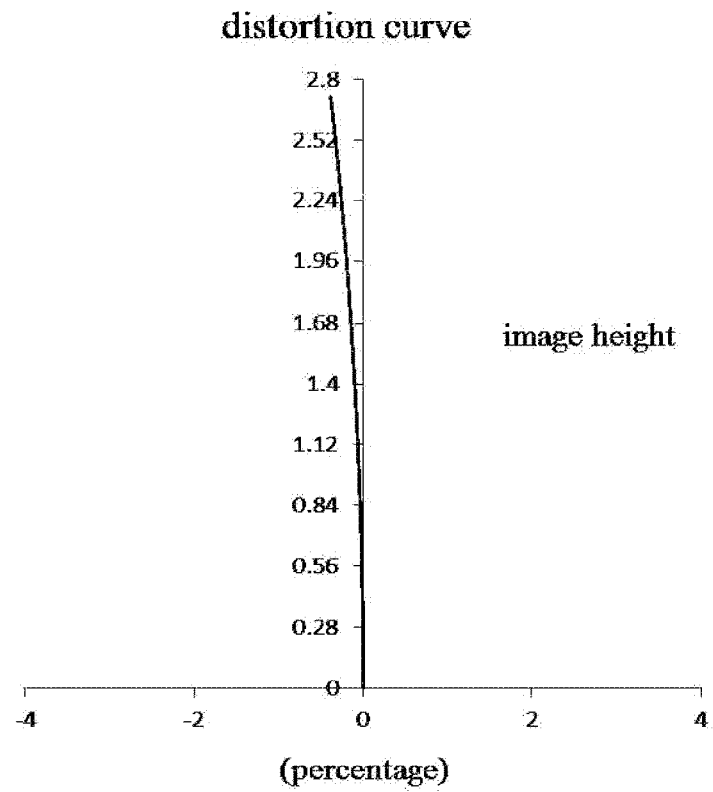
Figure 10D:
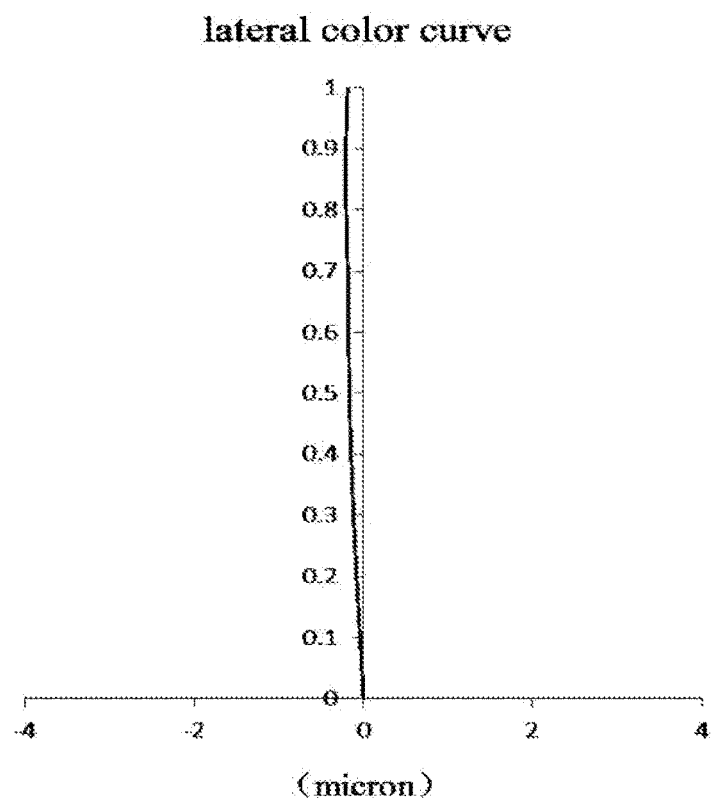
Figure 11A:
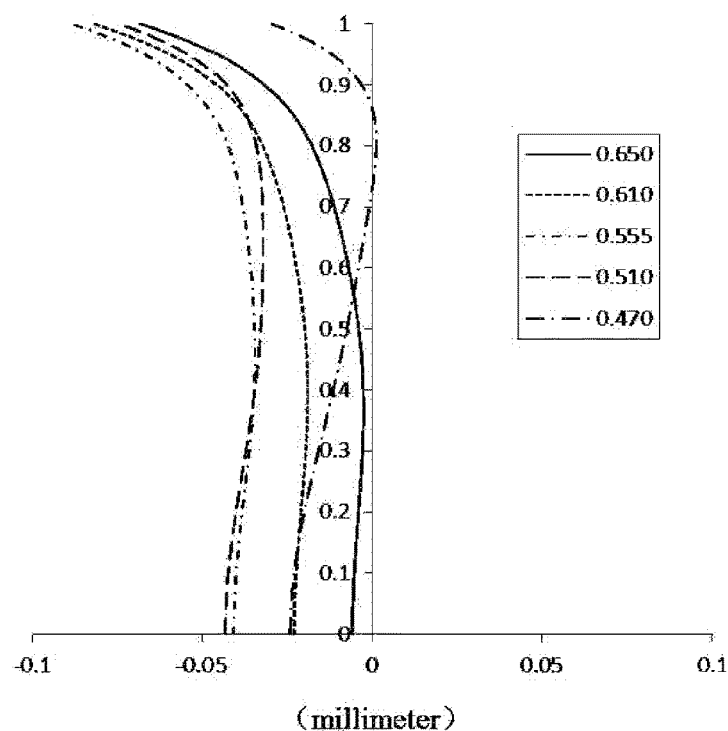
FIG. 11A to FIG. 11D show a longitudinal aberration curve, an astigmatism curve, a distortion curve and a lateral color curve of the zoom lens group in embodiment 2 in the intermediate state in the process of being switched from the long-focus state to the wide-angle state respectively.
Figure 11B:
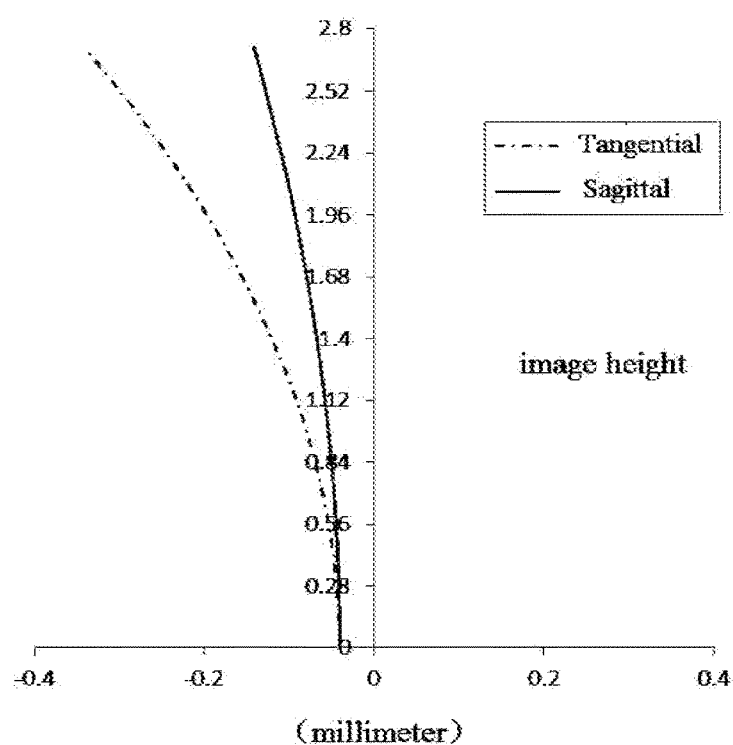
Figure 11C:
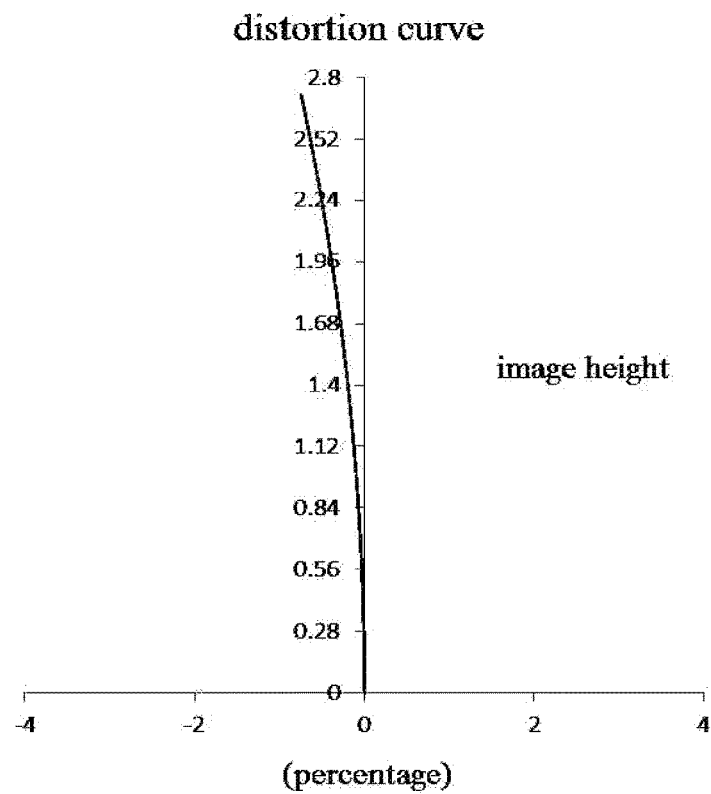
Figure 11D:
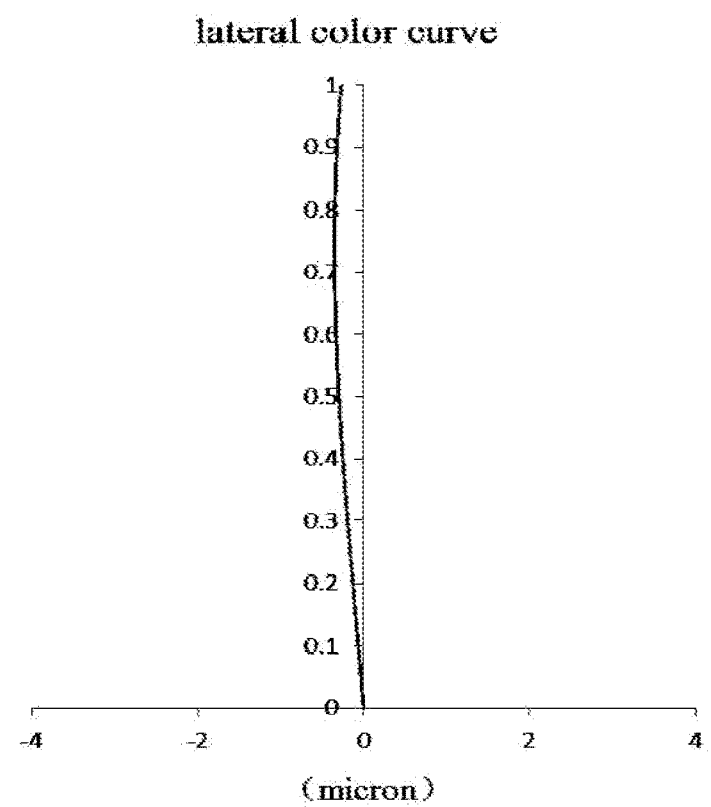
Figure 12A:
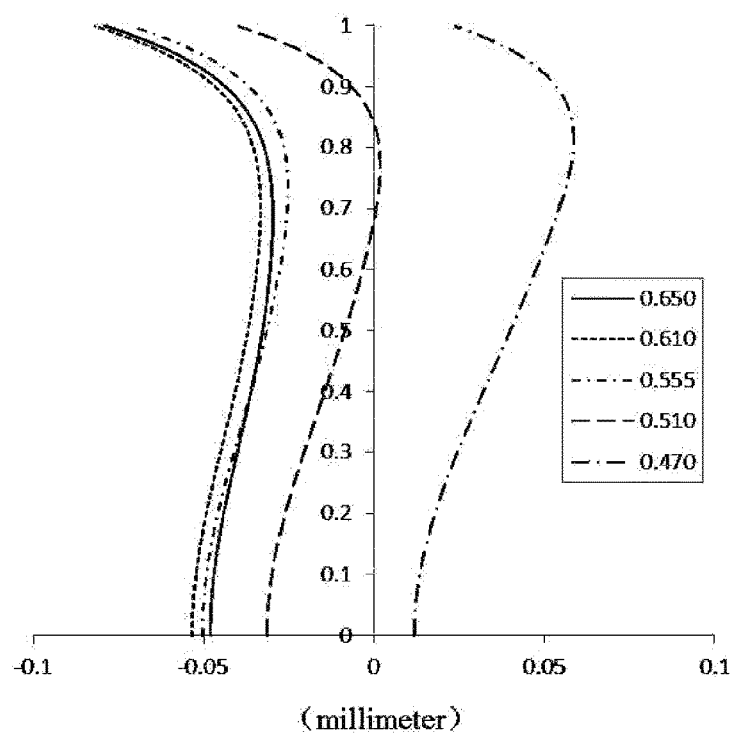
FIG. 12A to FIG. 12D show a longitudinal aberration curve, an astigmatism curve, a distortion curve and a lateral color curve of the zoom lens group in embodiment 2 in the wide-angle state respectively.
Figure 12B:
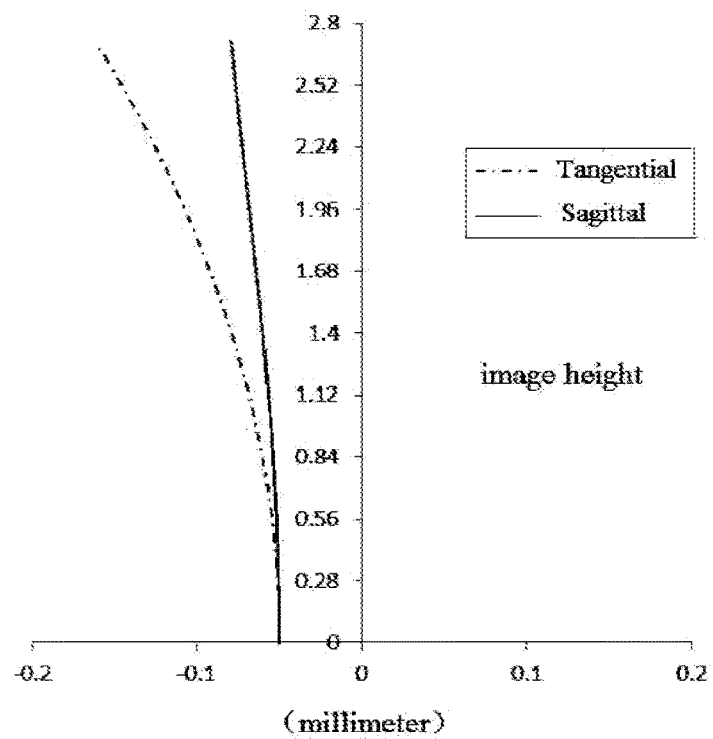
Figure 12C:
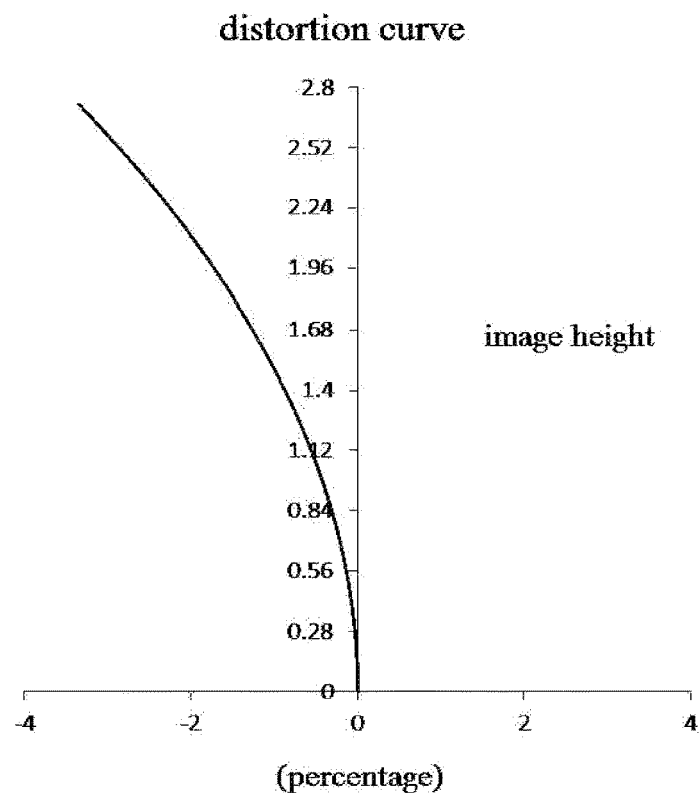
Figure 12D:
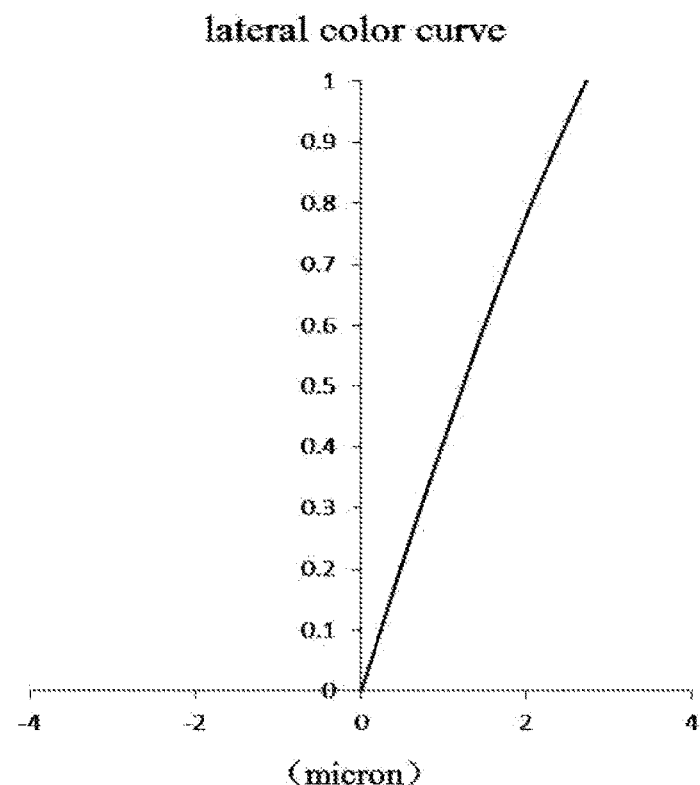

FIG. 10A, FIG. 11A and FIG. 12A separately show longitudinal aberration curves of the zoom lens group in embodiment 2 in the long-focus state, the intermediate state and the wide-angle state, which represents convergence focus deviations of light rays of different wavelengths after passing through the lenses. FIG. 10B, FIG. 11B and FIG. 12B separately show astigmatism curves of the zoom lens group in embodiment 2 in the long-focus state, the intermediate state and the wide-angle state, which represents a curvature of tangential image surface and a curvature of sagittal image surface. FIG. 10C, FIG. 11C and FIG. 12C separately show distortion curves of the zoom lens group in embodiment 2 in the long-focus state, the intermediate state and the wide-angle state, which represents distortion degree values corresponding to different image heights. FIG. 10D, FIG. 11D and FIG. 12D separately show lateral color curves of the zoom lens group in embodiment 2 in the long-focus state, the intermediate state and the wide-angle state, which represents deviations of light rays on different image heights of the imaging surface after passing through the lenses. It can be seen from FIG. 10A to FIG. 12D that the zoom lens group provided in embodiment 2 can realize a good imaging quality in each of all the states.

Embodiment 3

Figure 13:
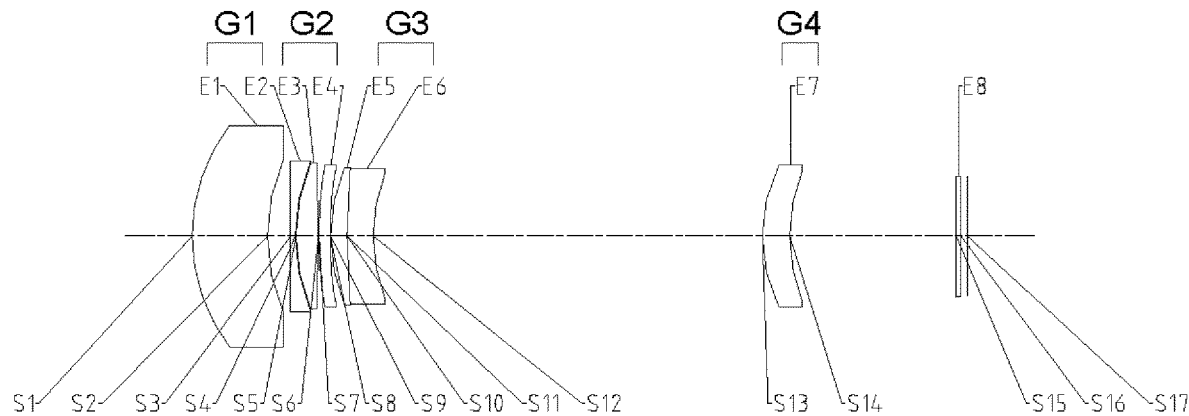
FIG. 13 shows a schematic structural view of a zoom lens group in a long-focus state according to embodiment 3 of the disclosure.
Figure 14:
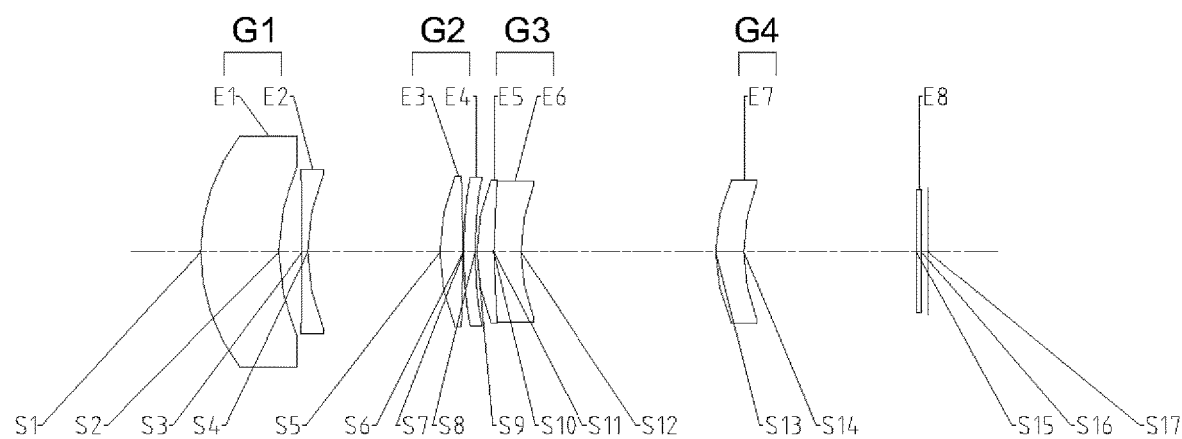
FIG. 14 shows a schematic structural view of the zoom lens group in an intermediate state in a process of being switched from the long-focus state to a wide-angle state according to embodiment 3 of the disclosure.

A zoom lens group according to embodiment 3 of the disclosure is described below with reference to FIG. 13 to FIG. 18D. FIG. 13 shows a schematic structural view of the zoom lens group in a long-focus state according to embodiment 3 of the disclosure; FIG. 14 shows a schematic structural view of the zoom lens group in an intermediate state in a process of being switched from the long-focus state to a wide-angle state according to embodiment 3 of the disclosure; and FIG. 15 shows a schematic structural view of the zoom lens group in the wide-angle state according to embodiment 3 of the disclosure.

Figure 15:
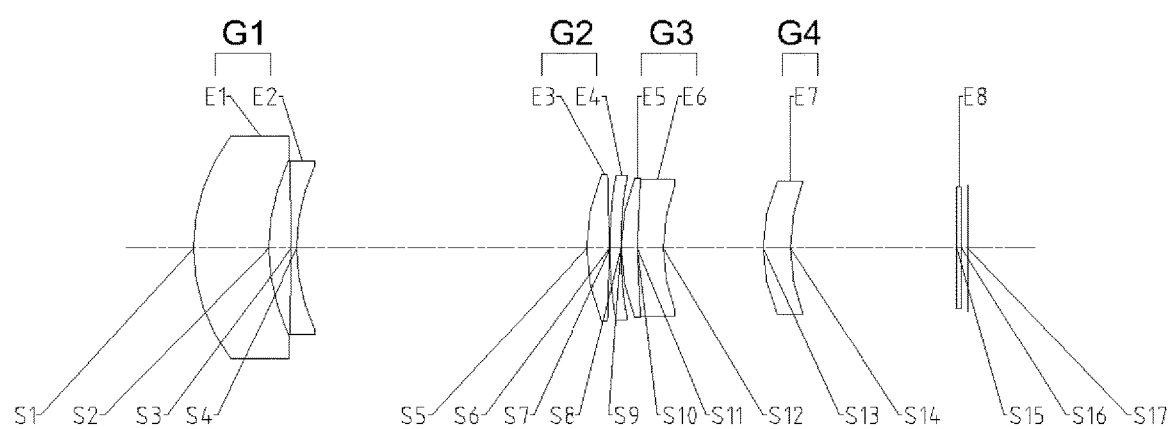
FIG. 15 shows a schematic structural view of the zoom lens group in the wide-angle state according to embodiment 3 of the disclosure.

As shown in FIG. 13 to FIG. 15, the zoom lens group sequentially includes from an object side to an image side: a first lens group G1 (a first lens E1 and a second lens E2), a second lens group G2 (a third lens E3 and a fourth lens E4), a third lens group G3 (a fifth lens E5 and a sixth lens E6), a fourth lens group G4 (a seventh lens E7), an optical filter E8 and an imaging surface S17.

An object-side surface S1 of the first lens E1 is a convex surface, an image-side surface S2 thereof is a concave surface. An object-side surface S3 of the second lens E2 is a concave surface, an image-side surface S4 thereof is a concave surface. An object-side surface S5 of the third lens E3 is a convex surface, an image-side surface S6 thereof is a convex surface. An object-side surface S7 of the fourth lens E4 is a convex surface, an image-side surface S8 thereof is a concave surface. An object-side surface S9 of the fifth lens E5 is a convex surface, an image-side surface S10 thereof is a concave surface. An object-side surface S11 of the sixth lens E6 is a convex surface, an image-side surface S12 thereof is a concave surface. An object-side surface S13 of the seventh lens E7 is a convex surface, an image-side surface S14 thereof is a concave surface. The optical filter E8 has an object-side surface S15 and an image-side surface S16. Light from an object sequentially penetrates through each of the surfaces from S1 to S16 and is finally imaged on the imaging surface S17.

Table 7 shows a table of basic parameters of the zoom lens group in embodiment 3, wherein units of the curvature radius and the thickness/distance are both millimeter (mm).

TABLE 7

| Surface number | Surface type | Curvature radius | Thickness/ distance | Refractive index | Abbe number | Material | Conic coefficient |
|---|---|---|---|---|---|---|---|
| OBJ | Sphere | Infinity | Infinity | | | | |
| S1 | Sphere | 8.2831 | 3.3927 | 1.91 | 31.4 | Glass | |
| S2 | Sphere | 8.7411 | 1.0372 | | | | |
| S3 | Sphere | −180.7267 | 0.2500 | 1.65 | 58.4 | Glass | |
| S4 | Sphere | 8.6366 | D4 | | | | |
| S5 (STO) | Sphere | 8.5320 | 1.0160 | 1.74 | 52.7 | Glass | |
| S6 | Sphere | −66.0563 | 0.0300 | | | | |
| S7 | Aspherical surface | 22.6594 | 0.5000 | 1.67 | 20.4 | Plastic | 0.0000 |

TABLE 7-continued

| Surface number | Surface type | Curvature radius | Thickness/ distance | Refractive index | Abbe number | Material | Conic coefficient |
|---|---|---|---|---|---|---|---|
| S8 | Aspherical surface | 24.3013 | D8 | | | | 0.0000 |
| S9 | Sphere | 8.1849 | 0.7322 | 1.50 | 81.6 | Glass | |
| S10 | Sphere | 33.6591 | 0.0000 | | | | |
| S11 | Sphere | 33.6591 | 1.1795 | 1.93 | 20.9 | Glass | |
| S12 | Sphere | 7.8610 | D12 | | | | |
| S13 | Sphere | 7.3827 | 1.2294 | 1.93 | 20.9 | Glass | |
| S14 | Sphere | 8.1383 | 7.5282 | | | | |
| S15 | Sphere | Infinity | 0.2100 | 1.52 | 64.2 | | |
| S16 | Sphere | Infinity | 0.2900 | | | | |
| S17 | Sphere | Infinity | | | | | |

In the embodiment, by adjusting a spacing distance D4 on an optical axis between the first lens group and the second lens group, a spacing distance D8 on the optical axis between the second lens group and the third lens group and a spacing distance D12 on the optical axis between the third lens group and the fourth lens group, the zoom lens group is switched from the long-focus state to the wide-angle state or from the wide-angle state to the long-focus state. A total effective focal length f, an f-number Fno and a maximum field of view FOV of the zoom lens group, a total track length TTL of the zoom lens group and ImgH change as the zoom lens group is switched from the long-focus state to the wide-angle state or from the wide-angle state to the long-focus state, and ImgH is a half of a diagonal length of an effective pixel region on the imaging surface S17 of the zoom lens group.

Table 8 shows a table of various parameters of the zoom lens group in embodiment 3 in different states, wherein units of f, TTL, ImgH, D4, D8 and D12 are all millimeter (mm), and a unit of FOV is degree (°).

TABLE 8

| Various parameters | Long-focus state | Intermediate state | Wide-angle state |
|---|---|---|---|
| f | 35.33 | 20.00 | 12.89 |
| Fno | 4.19 | 3.01 | 2.45 |
| FOV | 8.9 | 15.8 | 25.0 |
| TTL | 35.00 | 31.68 | 35.00 |
| ImgH | 2.72 | 2.72 | 2.72 |
| D4 | 0.03 | 5.74 | 13.11 |
| D8 | 0.02 | 0.07 | 0.00 |
| D12 | 17.55 | 8.48 | 4.50 |

Table 9 shows high order term coefficients $A_4$, $A_6$, $A_8$, $A_{10}$, $A_{12}$, $A_{14}$, $A_{16}$, $A_{18}$, and $A_{20}$ applicable to various aspherical surfaces in embodiment 3, wherein each aspherical surface type can be defined by the equation (1) provided in above-mentioned embodiment 1.

TABLE 9

| Surface number | A4 | A6 | A8 | A10 | A12 | A14 | A16 | A18 | A20 |
|---|---|---|---|---|---|---|---|---|---|
| S7 | 4.9893E−05 | −4.5445E−05 | 3.8446E−05 | −1.1930E−05 | 2.2894E−06 | −2.7422E−07 | 1.9950E−08 | −8.0674E−10 | 1.3912E−11 |
| S8 | 4.0672E−04 | −4.6538E−05 | 4.5668E−05 | −1.4694E−05 | 2.9260E−06 | −3.6195E−07 | 2.7067E−08 | −1.1185E−09 | 1.9572E−11 |

Figure 16A:
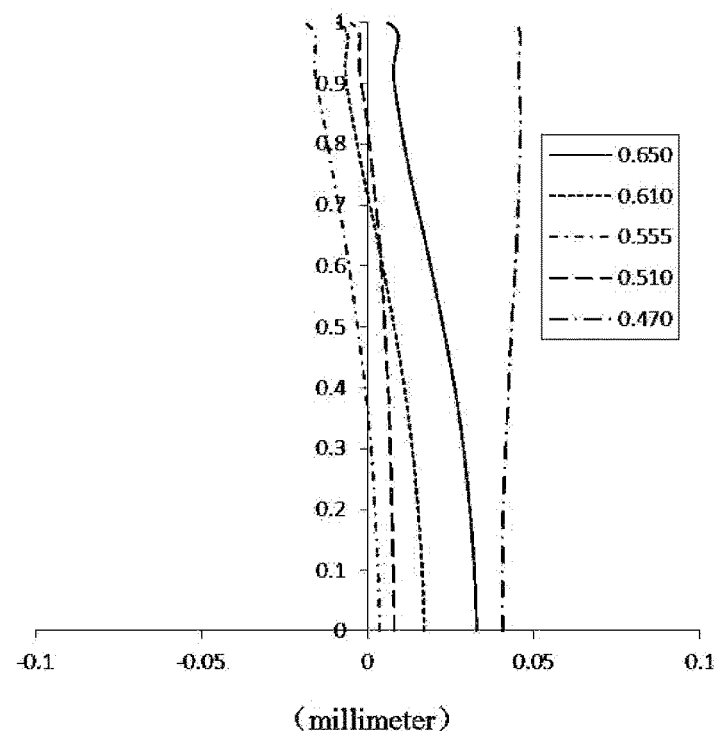
FIG. 16A to FIG. 16D show a longitudinal aberration curve, an astigmatism curve, a distortion curve and a lateral color curve of the zoom lens group in embodiment 3 in the long-focus state respectively.
Figure 16B:
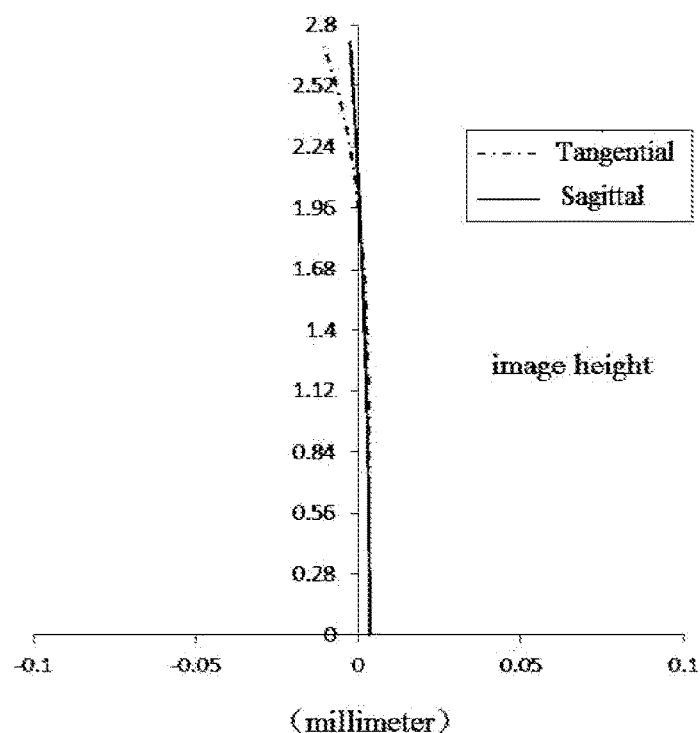
Figure 16C:
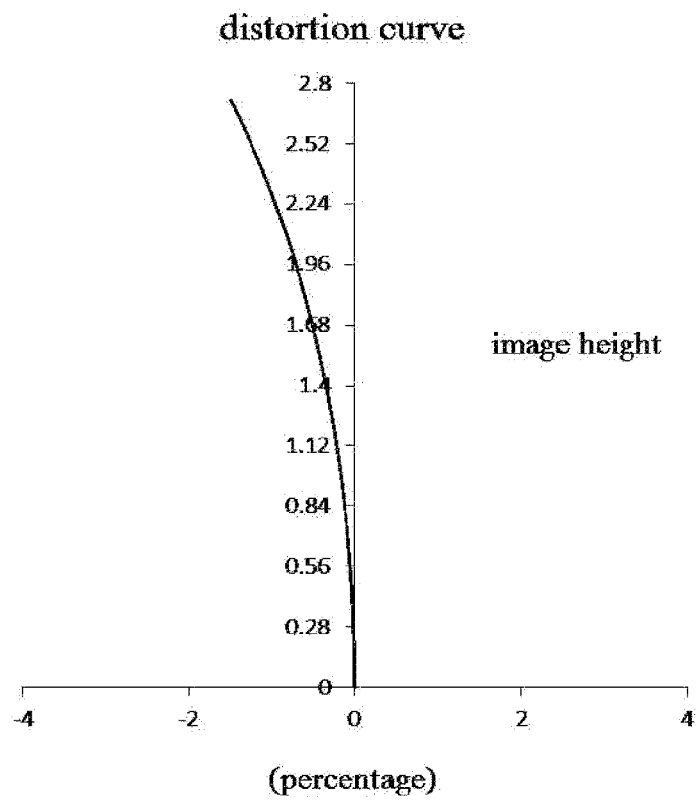
Figure 16D:
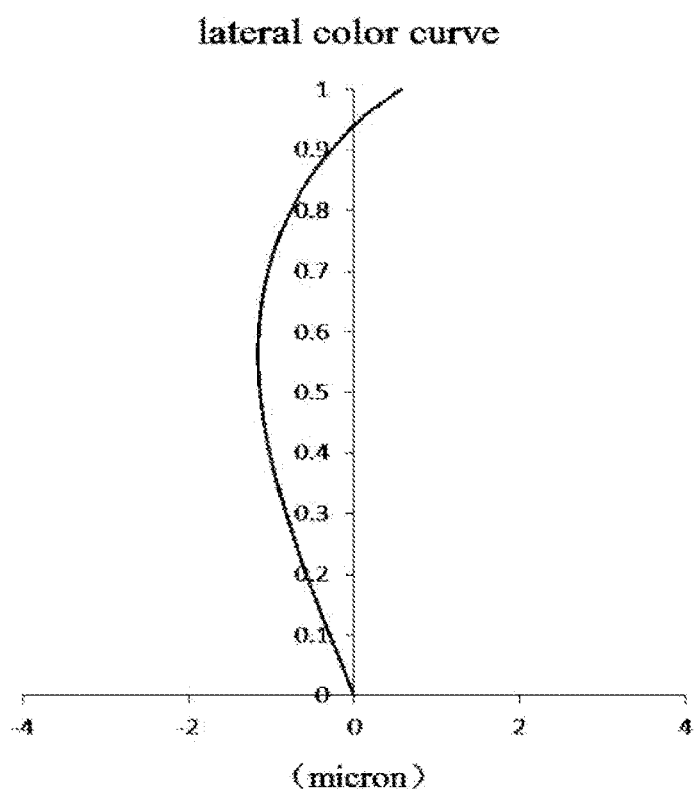
Figure 17A:
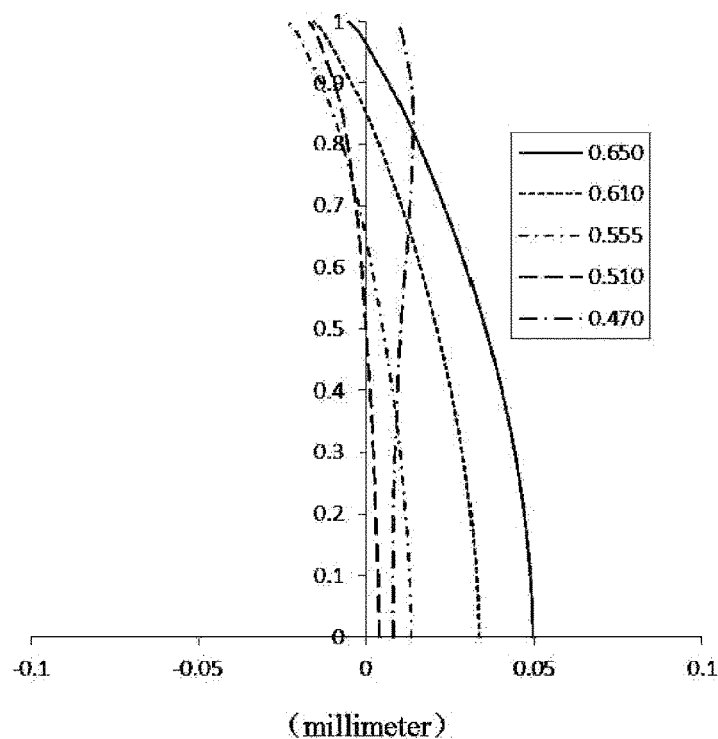
FIG. 17A to FIG. 17D show a longitudinal aberration curve, an astigmatism curve, a distortion curve and a lateral color curve of the zoom lens group in embodiment 3 in the intermediate state in the process of being switched from the long-focus state to the wide-angle state respectively.
Figure 17B:
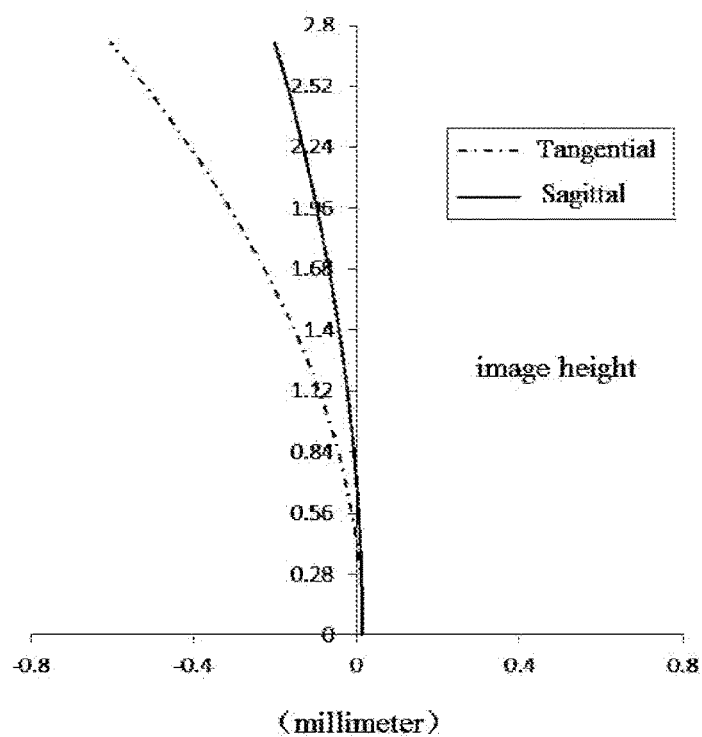
Figure 17C:
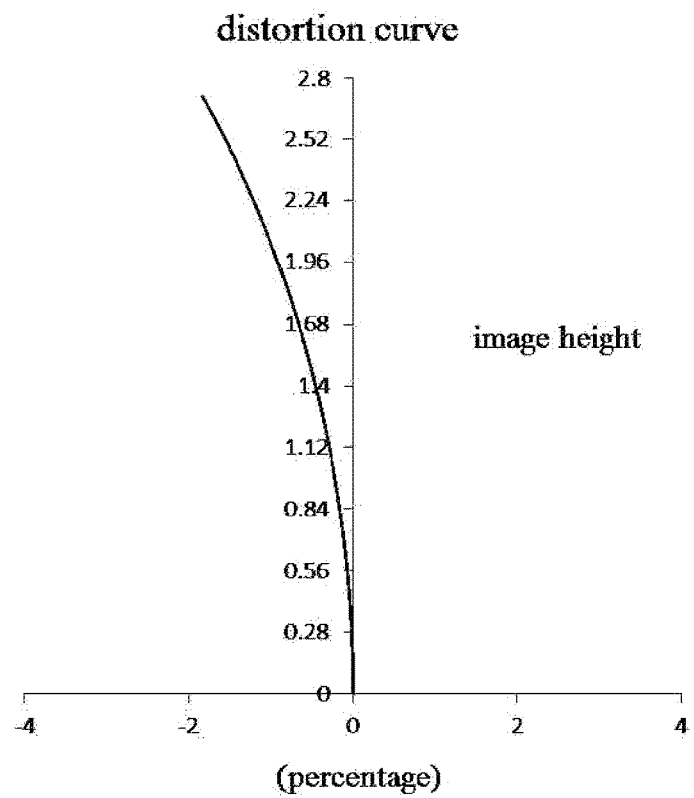
Figure 17D:
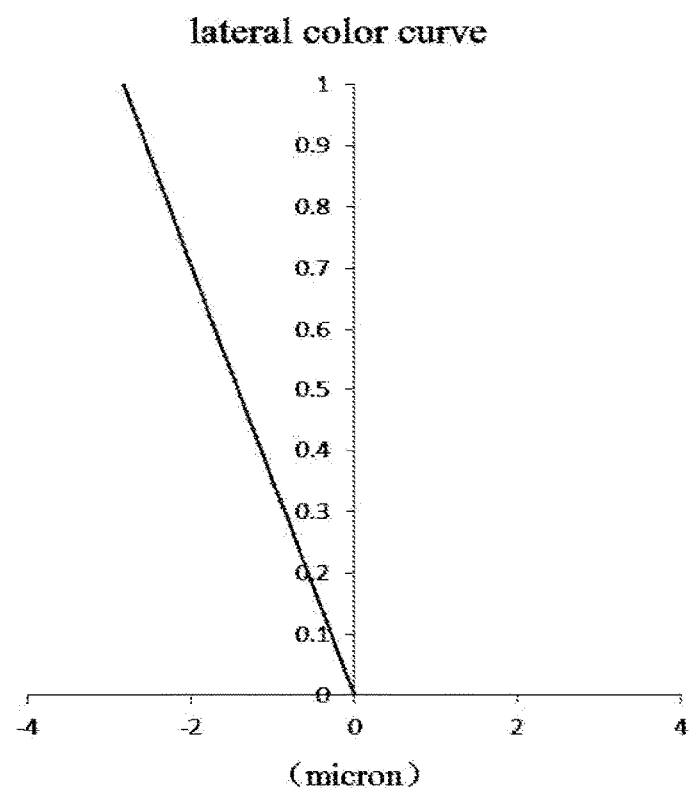
Figure 18A:
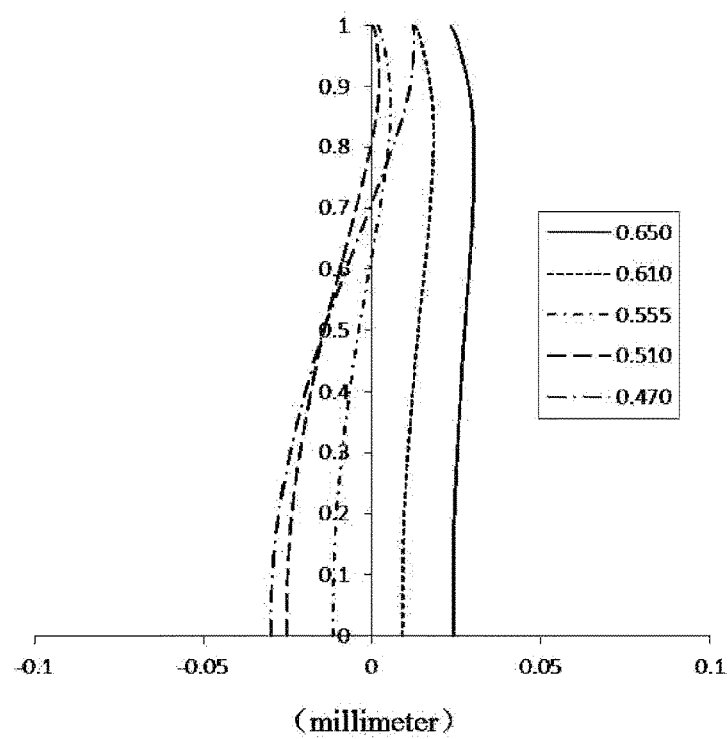
FIG. 18A to FIG. 18D show a longitudinal aberration curve, an astigmatism curve, a distortion curve and a lateral color curve of the zoom lens group in embodiment 3 in the wide-angle state respectively.
Figure 18B:
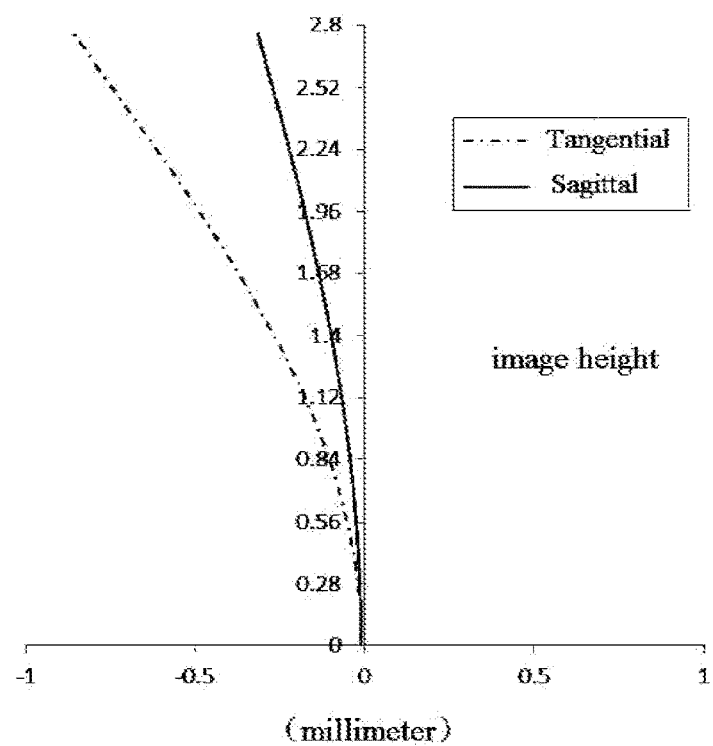
Figure 18C:
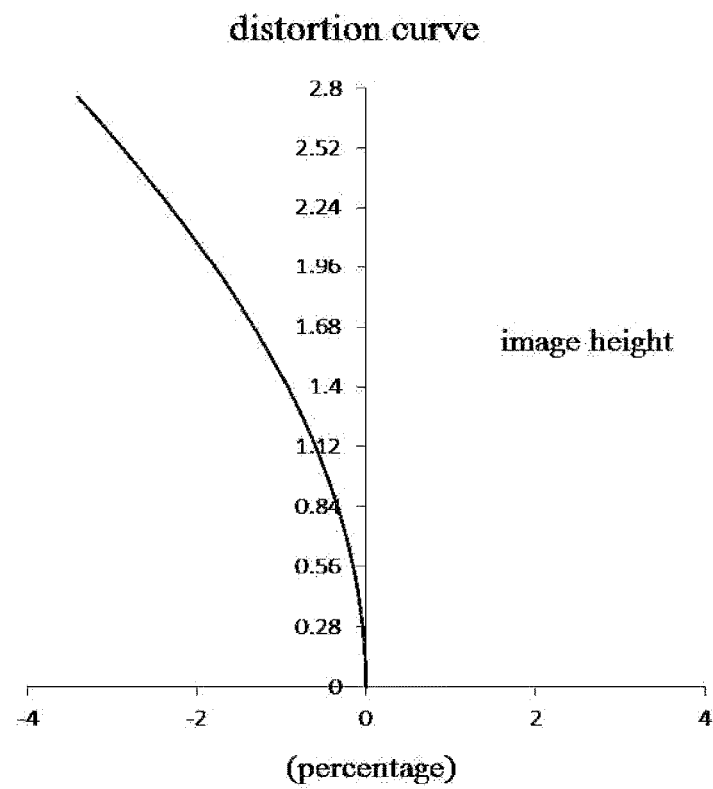
Figure 18D:
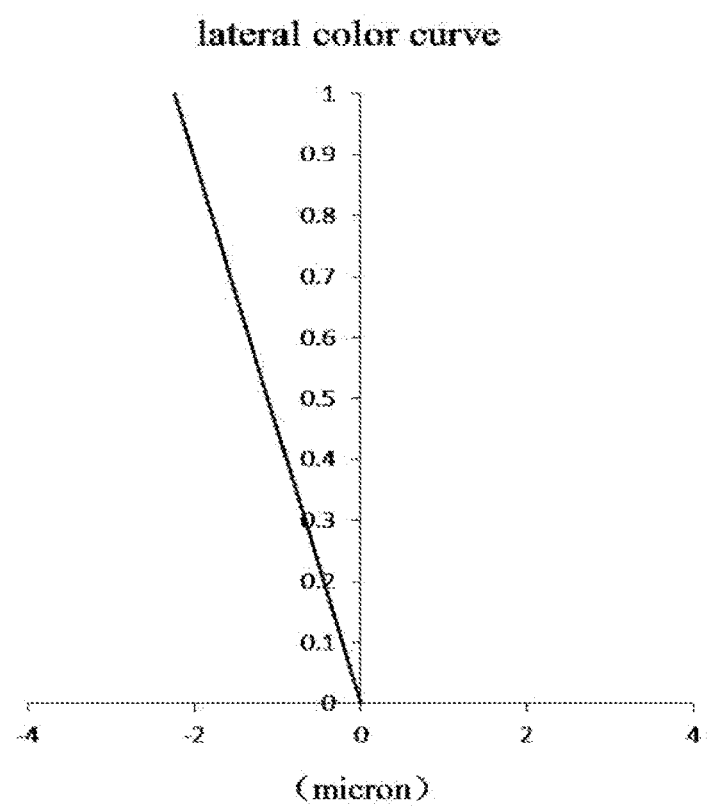

FIG. 16A, FIG. 17A and FIG. 18A separately show longitudinal aberration curves of the zoom lens group in embodiment 3 in the long-focus state, the intermediate state and the wide-angle state, which represents convergence focus deviations of light rays of different wavelengths after passing through the lenses. FIG. 16B, FIG. 17B and FIG. 18B separately show astigmatism curves of the zoom lens group in embodiment 3 in the long-focus state, the intermediate state and the wide-angle state, which represents a curvature of tangential image surface and a curvature of sagittal image surface. FIG. 16C, FIG. 17C and FIG. 18C separately show distortion curves of the zoom lens group in embodiment 3 in the long-focus state, the intermediate state and the wide-angle state, which represents distortion degree values corresponding to different image heights. FIG. 16D, FIG. 17D and FIG. 18D separately show lateral color curves of the zoom lens group in embodiment 3 in the long-focus state, the intermediate state and the wide-angle state, which represents deviations of light rays on different image heights of the imaging surface after passing through the lenses. It can be seen from FIG. 16A to FIG. 18D that the zoom lens group provided in embodiment 3 can realize a good imaging quality in each of all the states.

In summary, embodiments 1 to embodiments 3 separately satisfy the relations shown in Table 10.

TABLE 10

| | Embodiment | | |
|---|---|---|---|
| Conditional expression | 1 | 2 | 3 |
| FT/FW | 1.97 | 1.99 | 2.74 |
| F1/F2 | −1.65 | −1.66 | −2.85 |
| FT (mm) | 29.94 | 30.06 | 35.33 |
| (R1 + R2)/FW | 1.13 | 1.23 | 1.32 |
| (f11 + f12)/f31 | 1.03 | 0.98 | 1.20 |
| f21/R5 | 1.10 | 0.90 | 1.20 |
| CT1/CT7 | 2.65 | 1.08 | 2.76 |
| R13/R14 | 0.92 | 0.75 | 0.91 |
| FOVW (°) | 20.9 | 21.1 | 25.0 |

The disclosure also provides an imaging device, wherein the electronic photosensitive element can be a Charge Coupled Device (CCD) or a Complementary Metal Oxide Semiconductor (CMOS). The imaging device may be a stand-alone imaging device, such as a digital camera, or an imaging module integrated on mobile electronic equipment, such as a cell phone. The imaging device is equipped with the zoom lens group described above.

The above description is only description about the preferred embodiments of the disclosure and adopted technical principles. Those skilled in the art should know that the scope of present disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. A zoom lens group with seven lenses, sequentially comprising from an object side to an image side along an optical axis:
   a first lens group having a negative refractive power and comprising a first lens and a second lens, wherein the first lens has a positive refractive power, an object-side surface thereof is a convex surface, and an image-side surface thereof is a concave surface;
   a second lens group having a positive refractive power and comprising a third lens and a fourth lens;
   a third lens group having a refractive power and comprising a fifth lens and a sixth lens, wherein the fifth lens and the sixth lens are formed into a cemented lens; and
   a fourth lens group having a refractive power and comprising a seventh lens; and
   wherein by adjusting a spacing distance on the optical axis between the first lens group and the second lens group, a spacing distance on the optical axis between the second lens group and the third lens group and a spacing distance on the optical axis between the third lens group and the fourth lens group, the zoom lens group is switched from a long-focus state to a wide-angle state;
   a total effective focal length FT when the zoom lens group is in the long-focus state satisfies: 29 mm<FT<36 mm.

2. The zoom lens group as claimed in claim 1, wherein a total effective focal length FT when the zoom lens group is in the long-focus state and a total effective focal length FW when the zoom lens group is in the wide-angle state satisfy: 1.9<FT/FW<2.9.

3. The zoom lens group as claimed in claim 1, wherein an effective focal length F1 of the first lens group and an effective focal length F2 of the second lens group satisfy: −2.9<F1/F2<−1.6.

4. The zoom lens group as claimed in claim 1, wherein a curvature radius R1 of the object-side surface of the first lens, a curvature radius R2 of the image-side surface of the first lens and a total effective focal length FW when the zoom lens group is in the wide-angle state satisfy: 1.0<(R1+R2)/FW<1.5.

5. The zoom lens group as claimed in claim 1, wherein an effective focal length f11 of the first lens, an effective focal length f12 of the second lens and an effective focal length f31 of the fifth lens satisfy: 0.8<(f11+f12)/f31<1.3.

6. The zoom lens group as claimed in claim 1, wherein an effective focal length f21 of the third lens and a curvature radius R5 of an object-side surface of the third lens satisfy: 0.8<f21/R5<1.3.

7. The zoom lens group as claimed in claim 1, wherein a center thickness CT1 of the first lens on the optical axis and a center thickness CT7 of the seventh lens on the optical axis satisfy: 1.0<CT1/CT7<2.8.

8. The zoom lens group as claimed in claim 1, wherein a curvature radius R13 of an object-side surface of the seventh lens and a curvature radius R14 of an image-side surface of the seventh lens satisfy: 0.5<R13/R14<1.0.

9. The zoom lens group as claimed in claim 1, wherein a maximum angle of field of view FOVW when the zoom lens group is in the wide-angle state satisfies: 20°<FOVW<26°.

10. The zoom lens group as claimed in claim 1, wherein at least one of the third lens and the fourth lens is a plastic lens, and at least one of an object-side surface of the third lens, an image-side surface of the third lens, an object-side surface of the fourth lens and an image-side surface of the fourth lens is an aspherical surface.

11. The zoom lens group as claimed in claim 1, wherein lenses in at least one of the first lens group and the third lens group are glass lenses.

\* \* \* \* \*